United States Patent
Eguchi

(10) Patent No.: US 6,220,714 B1
(45) Date of Patent: Apr. 24, 2001

(54) IMAGE DISPLAY APPARATUS

(75) Inventor: Naoya Eguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/308,594

(22) PCT Filed: Sep. 22, 1998

(86) PCT No.: PCT/JP98/04271

§ 371 Date: Jul. 16, 1999

§ 102(e) Date: Jul. 16, 1999

(87) PCT Pub. No.: WO99/16040

PCT Pub. Date: Apr. 1, 1999

(30) Foreign Application Priority Data

Sep. 22, 1997 (JP) .................................................. 9-257220

(51) Int. Cl.⁷ .................................................. G03B 21/14
(52) U.S. Cl. .................................................. 353/122; 353/38
(58) Field of Search .................................. 362/268, 230, 362/231, 259, 293; 353/38, 69, 100, 102, 97, 122, 31, 34, 5, 7

(56) References Cited

U.S. PATENT DOCUMENTS

| | | | |
|---|---|---|---|
| 5,971,545 | * 10/1999 | Haitz | 353/31 |
| 6,005,722 | * 12/1999 | Butterwirth et al. | 353/33 |
| 6,120,152 | * 9/2000 | Nakayama et al. | 353/31 |
| 6,139,156 | * 10/2000 | Okamori et al. | 353/102 |
| 6,147,802 | * 11/2000 | Itoh et al. | 349/5 |

FOREIGN PATENT DOCUMENTS

| | | |
|---|---|---|
| 51-119243 | 10/1976 | (JP) . |
| 3-228042 | 10/1991 | (JP) . |
| 4-263244 | 9/1992 | (JP) . |

* cited by examiner

*Primary Examiner*—William Dowling
(74) *Attorney, Agent, or Firm*—Ronald P. Kananen; Rader, Fishman & Grauer

(57) ABSTRACT

The present invention provides an image display apparatus comprising a light source, a coupling lens, an integrator and a light valve. If $\theta_{LV1}$ is the largest value that can be taken by the angle formed by light irradiating said light valve and the optical axis as viewed along the short edges of said light valve, $\theta_{LV2}$ is the largest value that can be taken by the angle formed by light irradiating said light valve and the optical axis as viewed along the long edges of said light valve, $L_{LV1}$ is the length of the short edges of said light valve, $L_{LV2}$ is the length of the long edge of said light valve and $NA_{LED}$ is the effective numerical aperture of said coupling lens, then, the surface area of the light emitting region of said light source is not greater than $(L_{LV1} \times \theta_{LV1}/NA_{LED}) \times (L_{LV2} \times \theta_{LV2}/NA_{LED})$. Such an image display apparatus is adapted to evenly and uniformly irradiate the light valve of the apparatus with rays of light emitted from the light source with an improved light irradiation efficiency.

15 Claims, 17 Drawing Sheets

IMAGE DISPLAY APPARATUS

TECHNICAL FIELD

This invention relates to an image display apparatus for displaying images by modulating light from a light source by means of light valves.

BACKGROUND ART

FIG. 1 of the accompanying drawings schematically illustrate the configuration of a known projection type image display apparatus. The image display apparatus comprises a reflector plate 100 having a reflecting surface of paraboloid of revolution, a light source 101 arranged at the focal point of the reflector plate 100, an integrator 102, a red color separating mirror 103R, a green color separating mirror 103G and a blue color separating mirror 103B.

The image display apparatus additionally comprises a cuboidal color synthesizer prism 104 so arranged as to have one of its surface 104G be stricken by green color light reflected by the green color separating mirror 103G, a reflector mirror 105R so arranged as to cause red color light reflected by the red color separating mirror 103R to strike another surface 104R of the color synthesizer prism 104 perpendicular to the surface 104G, another reflector mirror 105B so arranged as to cause blue color light reflected by the blue color separating mirror 103B to strike still another surface 104B of the color synthesizer prism 104 parallel to the surface 104R, an optical path length regulating lens 106 arranged between the green color separating mirror 103G and the blue color separating mirror 103B and another optical path length regulating lens 107 arranged between the blue color separating mirror 103B and the reflector mirror 105B.

The image display apparatus comprises still additionally a light valve for red light 108R arranged between the reflector mirror 105R and the surface 104R of the color synthesizer prism, a lens 109R arranged between the reflector mirror 105R and the light valve for red light 108R, a light valve for green light 108G arranged between the green color separating mirror 103G and the surface 104G of the color synthesizer prism, another lens 109G arranged between the green color separating mirror 103G and the light valve for green light 108G, a light valve for blue light 108B arranged between the reflector mirror 105B and the surface 104B of the color synthesizer prism and still another lens 109B arranged between the reflector mirror 105B and the light valve for blue 108B.

The image display apparatus further comprises a projector lens 110 arranged opposite to the surface of the color synthesizer prism 104 parallel to the surface 104G.

In a projection type image display apparatus having the above described configuration, a white lamp such as a xenon lamp or a metal halide lamp is typically used for the light source 101. Light emitted from the light source 101 is reflected by the reflector plate 100 and both ultraviolet rays and infrared rays are removed from reflected light by means of a cut filter (not shown) before reflected light is made to strike the red color separating mirror 103R. Of the light striking the red color separating mirror 103R, red color light is reflected by the red color separating mirror 103R and further by the reflector mirror 105R before it passes through the lens 109R and the light valve for red light 108R and enters the color synthesizer prism 104. Light other than red Of the light striking the green color separating mirror 103G, green color light is reflected by the green color separating mirror 103G and then enters the color synthesizer prism 104 by way of the lens 109G and the light valve for green 108G. Of the light striking the green color separating mirror 103G, light other than green color light passes through the green color separating mirror 103G and strikes the blue color separating mirror 103B by way of the optical path length regulating lens 106.

Of the light striking the blue color separating mirror 103B, blue color light is reflected by the blue color separating mirror 103B and, after passing through the optical path length regulating lens 107, it is further reflected by the reflector mirror 105B and enters the color synthesizer prism 104 by way of the lens 109B and the light valve for blue light 108B.

All lights of different colors that enter the color synthesizer prism 104 are synthetically combined together by the color synthesizer prism 104 and passes through the projector lens 110 before projected onto a transmission type or reflection type screen.

Known projection type image display apparatus having the above described configuration is accompanied by the problem of a large spectrum width of light of each of the three primary colors separated by the respective color separating mirrors and a poor color purity. They are also accompanied by the problem of the difficulty with which the brightness of the entire quantity of light is regulated because a white lamp is used as light source and energized to show a predetermined level of brightness. Still additionally, they are accompanied by the problem of the extreme difficulty with which the brightness of each primary color is regulated because light of each primary color is separated by means of a color separating mirror.

The flux of light coming out of a white lamp normally shows a circular cross section. On the other hand, light valves to be irradiated with light normally have a rectangularly parallelepipedic profile. Therefore, the flux of light striking a light valve is required to have a diameter greater than the diagonal of the light valve in order to evenly irradiate the light valve with light. Then, there arises a problem of a poor irradiation efficiency of light emitted from the light source of any conventional image display apparatus.

As pointed out above, conventional projection type image display apparatus comprising a white lamp as light source are accompanied by a number of problems. In an attempt to avoid these problems, there has been proposed a projection type image display apparatus employing light emitting diodes of the three primary colors that are independent from each other as light source ensuring an enhanced level of color purity in order to replace the white lamp. Such a projection type image display apparatus shows an improved color reproduction ability over a wide spectral range due to the light source with high color purity such as that of light emitting diodes.

FIG. 2 shows an XY chromatogram illustrating the color reproduction spectrum of a projection type image display apparatus using light emitting diodes as light source, that of an CRT (Cathode-Ray Tube) using a fluorescent body and that of an NTSC (National Television System Committee) type image display apparatus, which are indicated respectively by symbols A1, A2 and A3 in FIG. 2.

As seen from FIG. 2, while the color reproduction spectrum of a conventional projection type image display apparatus using a white lamp as light source is narrower than that of a CRT using a fluorescent body, a projection type image display apparatus using light emitting diodes as light source with high color purity can provide a color reproduction spectrum wider than that of a CRT using a fluorescent body.

However, light emitting diodes provide a surface light source and rays of light emitted from the surface light source include extra-axial rays that are located off the optical axis of the optical system comprising the light emitting diodes. Then, rays of light including extra-axial rays emitted from the light source cannot evenly and uniformly irradiate a light valve and typically show a poor light irradiation efficiency.

DISCLOSURE OF THE INVENTION

Accordingly, it is the object of the present invention to provide an image display apparatus comprising a light source with an enhanced level of color purity other than a white lamp and adapted to evenly and uniformly irradiate the light valves of the apparatus with rays of light emitted from the light source with an improved light irradiation efficiency.

According to the invention, the above object is achieved by providing an image display apparatus characterized in that it comprises: a coupling lens for focusing light emitted from said light source: an integrator adapted to receive focused light coming from said coupling lens; and a substantially rectangularly parallelepipedic light valve adapted to be irradiated with light coming from said light source by way of said coupling lens and said integrator; and that said integrator is adapted to uniformize the distribution of intensity of light within the region of irradiation of light over said light valve; and the surface area of the light emitting region of said light source is not greater than $(L_{LV1} \times \theta_{LV1}/NA_{LED}) \times (L_{LV2} \times \theta_{LV2}/NA_{LED})$, where $\theta_{LV1}$ represents the largest value that can be taken by the angle formed by light irradiating said light valve and the optical axis as viewed along the short edges of said light valve, $\theta_{LV2}$ represents the largest value that can be taken by the angle formed by light irradiating said light valve and the optical axis as viewed along the long edges of said light valve, $L_{LV1}$ represents the length of the short edges of said light valve, $L_{LV2}$ represents the length of the long edge of said light valve and $NA_{LED}$ represents the effective numerical aperture of said coupling lens.

Thus, an image display apparatus according to the invention can efficiently irradiate the light valves with light emitted from the light source by appropriately defining the surface area of the light emitting region.

Preferably, in an image display apparatus according to the invention, said light source comprises a light emitting diode, a semiconductor laser device or an organic electroluminescence device.

Preferably, in an image display apparatus according to the invention, the light emitting region of said light source has a contour similar to that of the light valves. The light valves will be irradiated efficiently with light emitted from the light source when the light emitting region of the light source has a contour similar to that of the light valves.

Preferably, in an image display apparatus according to the invention, said light source includes a plurality of light emitting devices and the total surface area of the light emitting regions of the light emitting devices is not greater than $(L_{LV1} \times \theta_{LV1}/NA_{LED}) \times (L_{LV2} \times \theta_{LV2}/NA_{LED})$. As the total surface area of the light emitting regions of the light emitting devices is made not greater than $(L_{LV1} \times \theta_{LV1}/NA_{LED}) \times (L_{LV2} \times \theta_{LV2}/NA_{LED})$, the light valves will be irradiated efficiently with light emitted from each of the light emitting devices.

If the light source includes a plurality of light emitting devices in an image display apparatus according to the invention, preferably the light emitting region of each of said light emitting devices has a contour similar to that of the light valves. The light valves will be irradiated efficiently with light emitted from the light source when the light emitting region of each of the light emitting devices of the light source has a contour similar to that of the light valves.

Preferably, in an image display apparatus according to the invention, the display area of each of the light valves for actually displaying an image has short edges with a length equal to or smaller than the length $L_{LV1}$ of the short edges of said light valves and long edges with a length equal to or smaller than the length $L_{LV2}$ of the long edges of said light valves.

More specifically, it is preferable that the length $L_{LV1}$ of the short edges and the length $L_{LV2}$ of the long edges of said light valves are respectively greater than the length of the short edges and the length of the long edges of said display area of each of the light valves by 2 to 50%.

Preferably, in an image display apparatus according to the invention, said light source comprises a light emitting diode or a semiconductor laser device adapted to emit red light. If said light source of an image display apparatus according to the invention comprises a light emitting diode or a semiconductor laser device adapted to emit red light, it is preferably made of a material containing at least an element selected from a group of elements including B, Al, Ga, In and Tl and at least an element selected from a group of elements including N, P, As and Sb.

Alternatively or additionally, in an image display apparatus according to the invention, said light source may comprise a light emitting diode or a semiconductor laser device adapted to emit green light. If said light source of an image display apparatus according to the invention comprises a light emitting diode or a semiconductor laser device adapted to emit green light, it is preferably made of a material containing at least an element selected from a group of elements including B, Al, Ga, In and Tl and at least an element selected from a group of elements including N, P, As and Sb or a material containing at least an element selected from a group of elements including Be, Mg, Zn and Cd and at least an element selected from a group of elements including O, S, Se and Te.

Still alternatively or additionally, in an image display apparatus according to the invention, said light source may comprise a light emitting diode or a semiconductor laser device adapted to emit blue light. If said light source of an image display apparatus according to the invention comprises a light emitting diode or a semiconductor laser device adapted to emit blue light, it is preferably made of a material containing at least an element selected from a group of elements including B, Al, Ga, In and Tl and at least an element selected from a group of elements including N, P, As and Sb or a material containing at least an element selected from a group of elements including Be, Mg, Zn and Cd and at least an element selected from a group of elements including O, S, Se and Te.

BEST MODES FOR CARRYING OUT THE INVENTION

Now, the present invention will be described by referring to the accompanying drawings that illustrate preferred embodiments of the invention.

Figure 1:
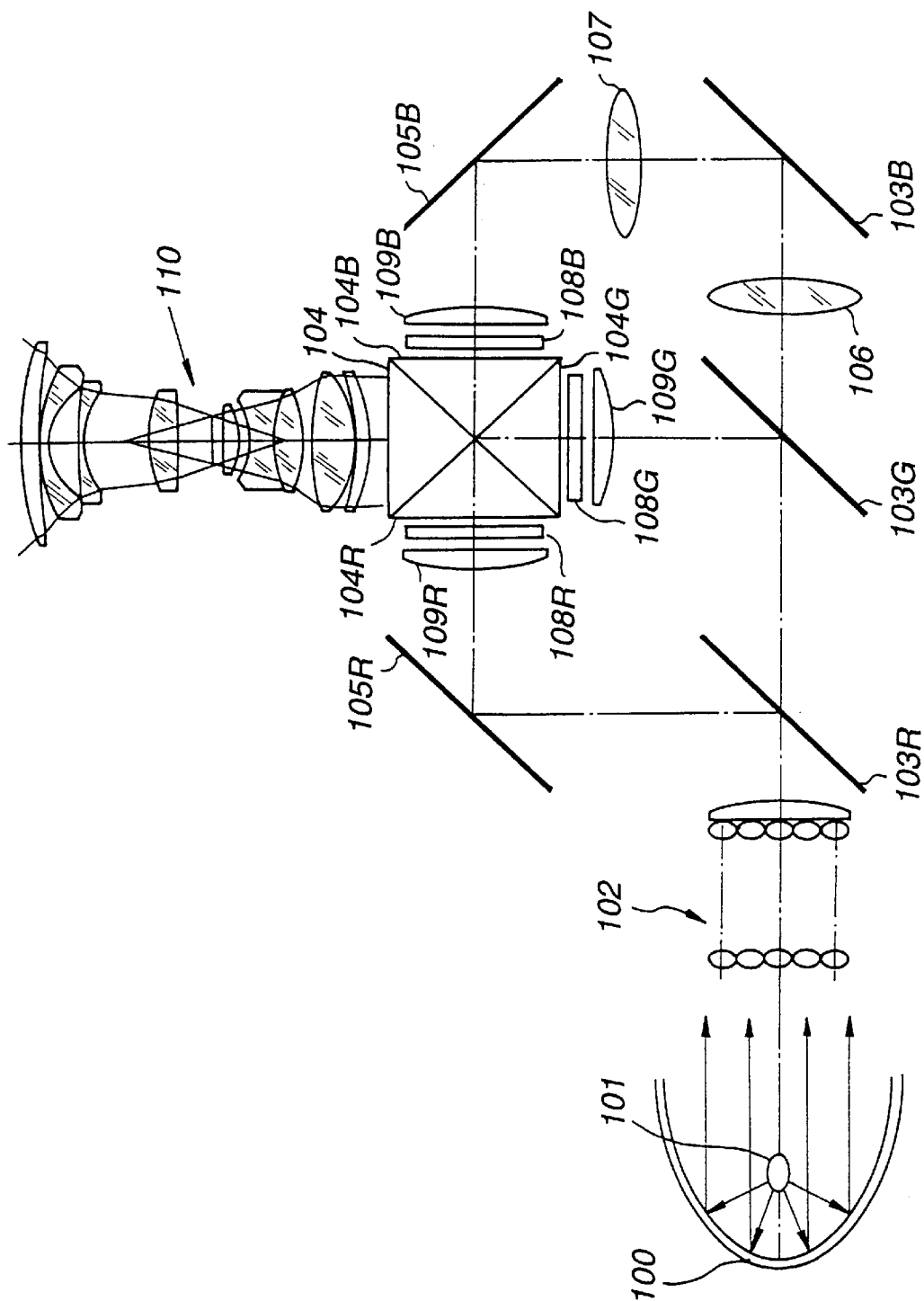
FIG. 1 is a schematic illustration of a conventional projection type image display apparatus, showing its schematic configuration.
Figure 2:
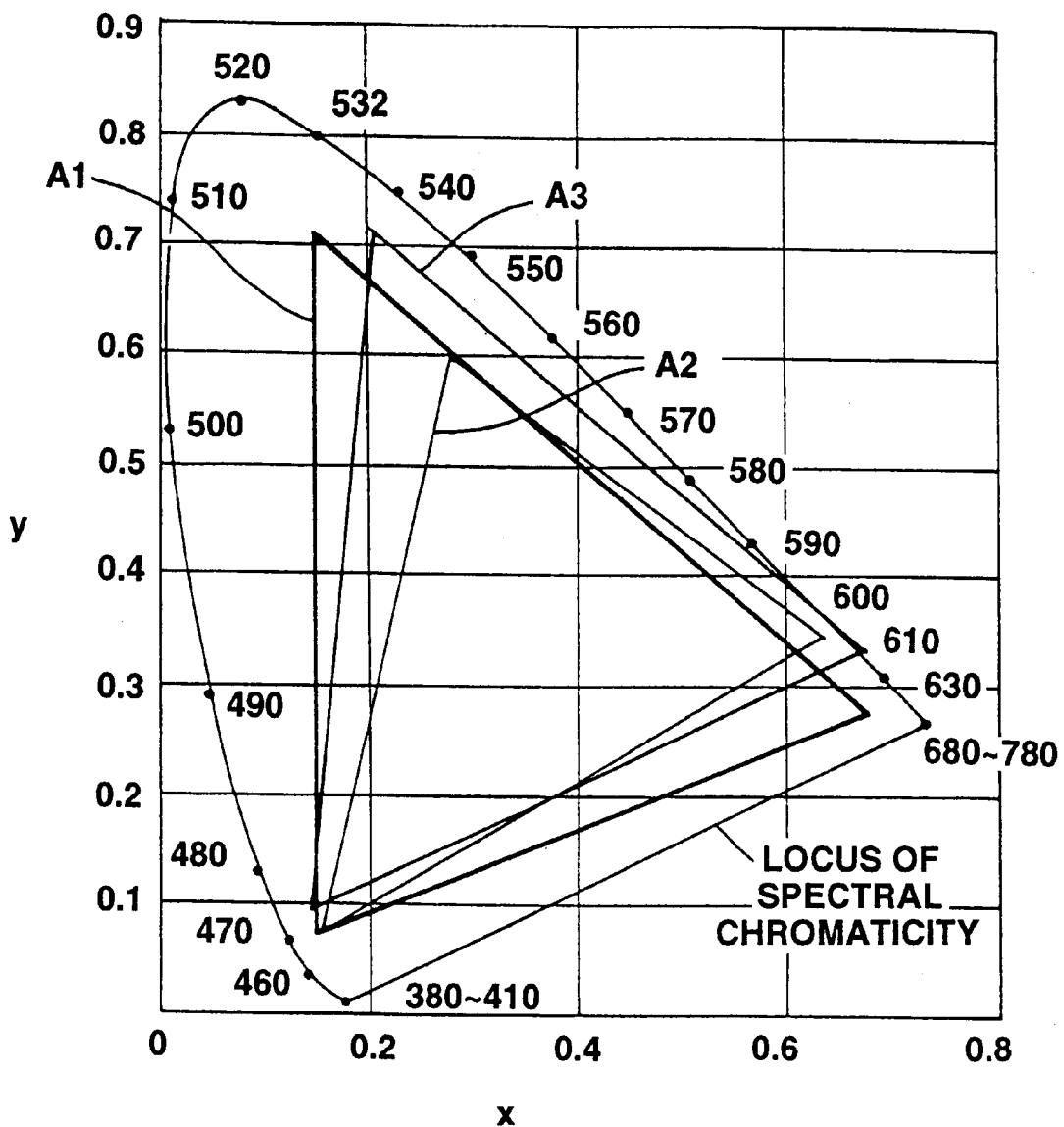
FIG. 2 is an XY chromatogram illustrating the color reproduction spectrum of a projection type image display apparatus using a light emitting diode as light source, that of an CRT (cathode ray tube) using a fluorescent body and that of an NTSC (National Television System Committee) type image display apparatus.
Figure 3:
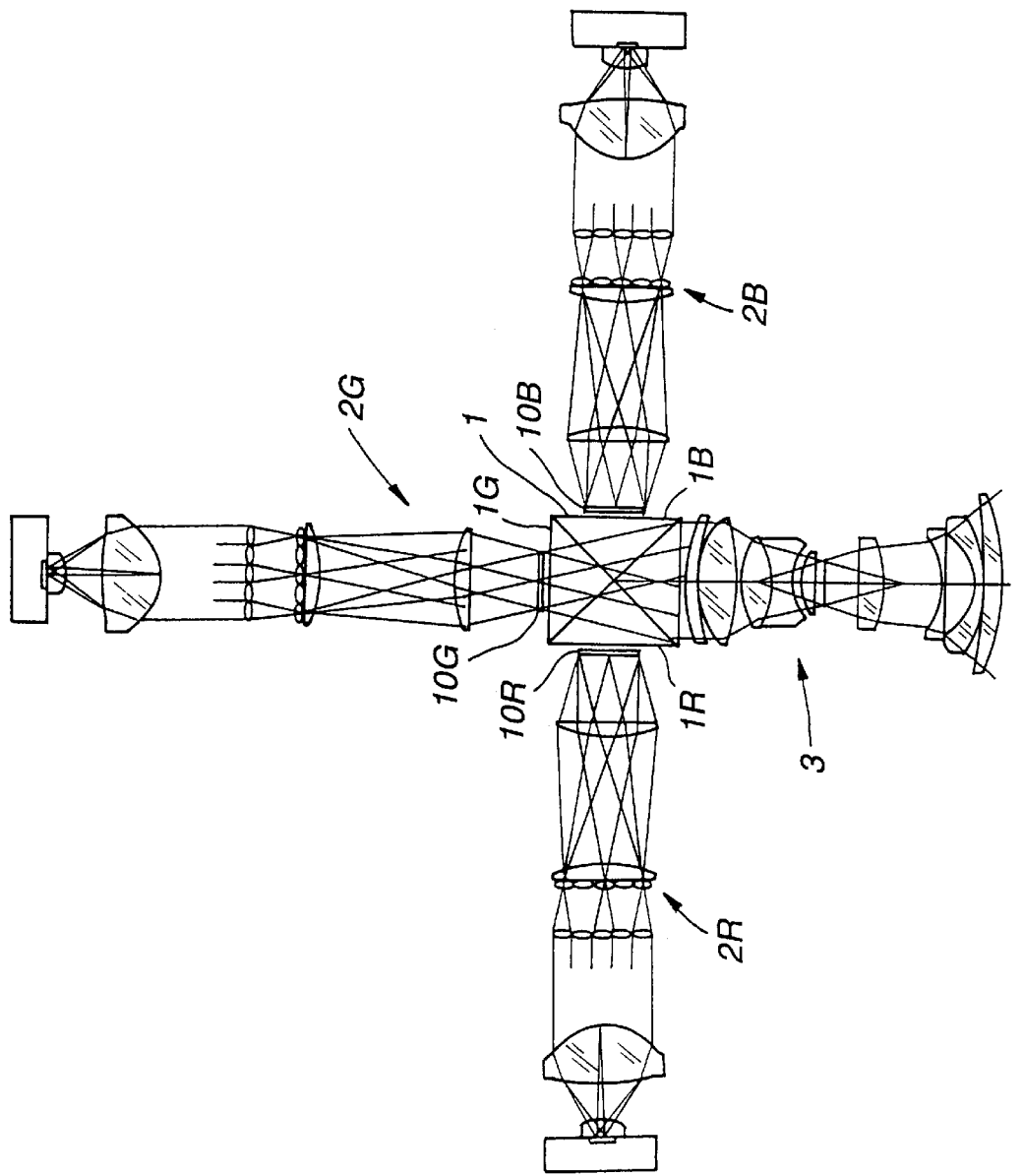
FIG. 3 is a schematic illustration of an embodiment of image display apparatus according to the invention, showing its schematic configuration.

FIG. 3 is a schematic illustration of an embodiment of image display apparatus according to the invention, showing its schematic configuration.

This embodiment of image display apparatus according to the invention comprises a cuboidal dichroic mirror 1, an lighting/optical system for green light 2G arranged vis-a-vis a surface 1G of the dichroic mirror 1, an lighting/optical system for red light 2R arranged vis-a-vis a surface 2R of the dichroic mirror 1 perpendicular to the surface 1G and a lighting/optical system for blue light 2B arranged vis-a-vis a surface 1B of the dichroic mirror 1 parallel to the surface 1R.

This embodiment of image display apparatus according to the invention additionally comprises a projector lens 3 arranged vis-a-vis the surface of the dichroic mirror 1 that is parallel to the surface 1G. The projector lens 3 is adapted to project light for the image produced by color synthesis of rays of light emitted from the lighting/optical systems 2G, 2R, 2B by means of the dichroic mirror 1 onto a transmission type or reflection type screen (not shown).

Figure 4:
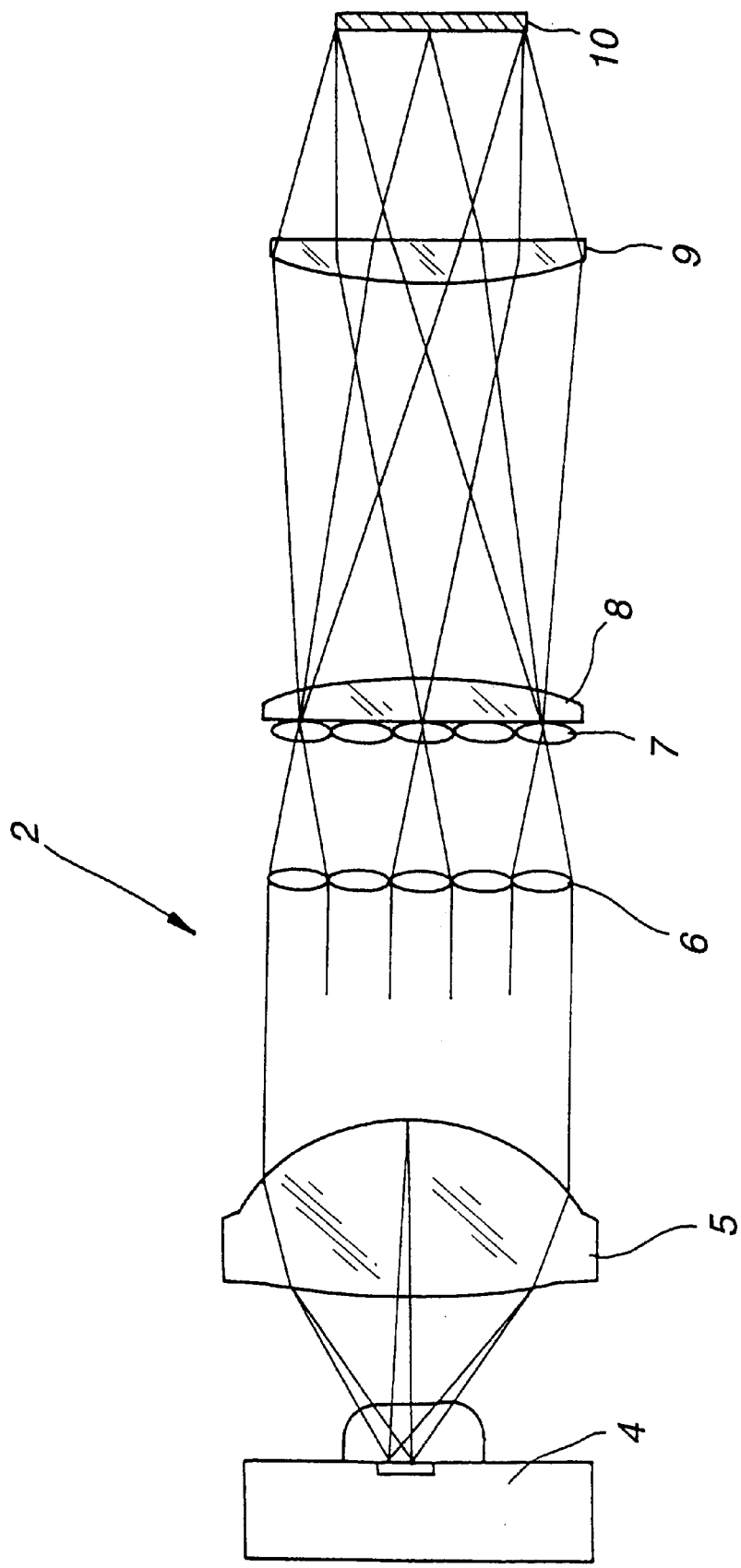
FIG. 4 is a schematic illustration of part the lighting/optical system of an image display apparatus according to the invention.

FIG. 4 is a schematic illustration of part the lighting/optical system 2 (as representative of 2G, 2R, 2B) that can be used for this embodiment of image display apparatus according to the invention.

The lighting/optical system 2 comprises a light emitting diode 4 operating as light source, a coupling lens 5, a first fly eye lens 6, a second fly eye lens 7, a first condenser lens 8, a second condenser lens 9 and a light valve 10 arranged in the above mentioned order, the light valve 10 being arranged vis-a-vis the corresponding surface of the dichroic mirror 1. The fly eye lenses 6, 7 operate as integrator for uniformizing the distribution of intensity of light emitted from the light emitting diode 4 and irradiating the light valve 10 within the region of irradiation of light over the light valve 10 and are arranged between the light emitting diode 4 and the light valve 10.

Rays of light emitted from the light emitting diode 4 is substantially collimated by the coupling lens 5. Since the light emitting diode 4 provides a surface light source, rays of light emitted from the light emitting diode 4 include extra-axial rays that are located off the optical axis of the optical system comprising the light emitting diode. After passing through the coupling lens 5, light enter the first fly eye lens 6.

The first fly eye lens 6 and the second fly eye lens 7 are arranged as two separate rows showing a conjugate positional relationship to provide a telecentric optical system. Thus, the fly eye lenses 6, 7 uniformize the angular distribution of the angles between the extra-axial rays of light and the optical axis. After passing through the second fly eye lens 7, light enters the first condenser lens.

In this embodiment, the second condenser lens 9 is so arranged as to show a conjugate positional relationship with the first condenser lens 8 and provide a telecentric optical system. Rays of light are then converged by the condenser lenses 8, 9 before entering the light valve 10.

The embodiment of image display apparatus according to the invention and illustrated in FIG. 3 comprises a total of three light valves including a light valve for red light 10R, a light valve for green light 10G and a light valve for blue light 10R. Rays of light emitted onto the light valves 10R, 10G, 10B are spatially modulated by the respective light valves 10R, 10G, 10B and, after passing through the respective light valves 10R, 10G, 10B, the modulated rays of red light, green light and blue light enter the dichroic mirror 1, where they are subjected to color synthesis. Then, the synthesized light is projected onto the screen by way of the projector lens 3.

Since the embodiment of image display apparatus according to the invention and illustrated in FIG. 3 comprises light emitting diodes 4 as light sources that are excellent in terms of color purity, it provides an enhanced color reproduction ability over a wide spectral range. Additionally, since the light emitting diodes 4 operate as independent light sources for red light, green light and blue light, the brightness of light can be regulated independently for the three primary colors and the overall quantity of light can also be regulated without difficulty in the embodiment of image display apparatus.

Now, a geometrical arrangement of the lenses and the light emitting diodes 4 in an image display apparatus according to the invention good for uniformizing the intensity of light emitted from the light emitting diodes 4 and improving the irradiation efficiency of light of the light valve 10 will be discussed by referring to FIG. 4. Note that, in the following description, affix "1" accompanying a symbol indicates that the symbol relates to the direction of the short edges of the light valve 10, whereas affix "2" accompanying a symbol indicates that the symbol relates to the direction of the long edges of the light valve 10.

Figure 5:
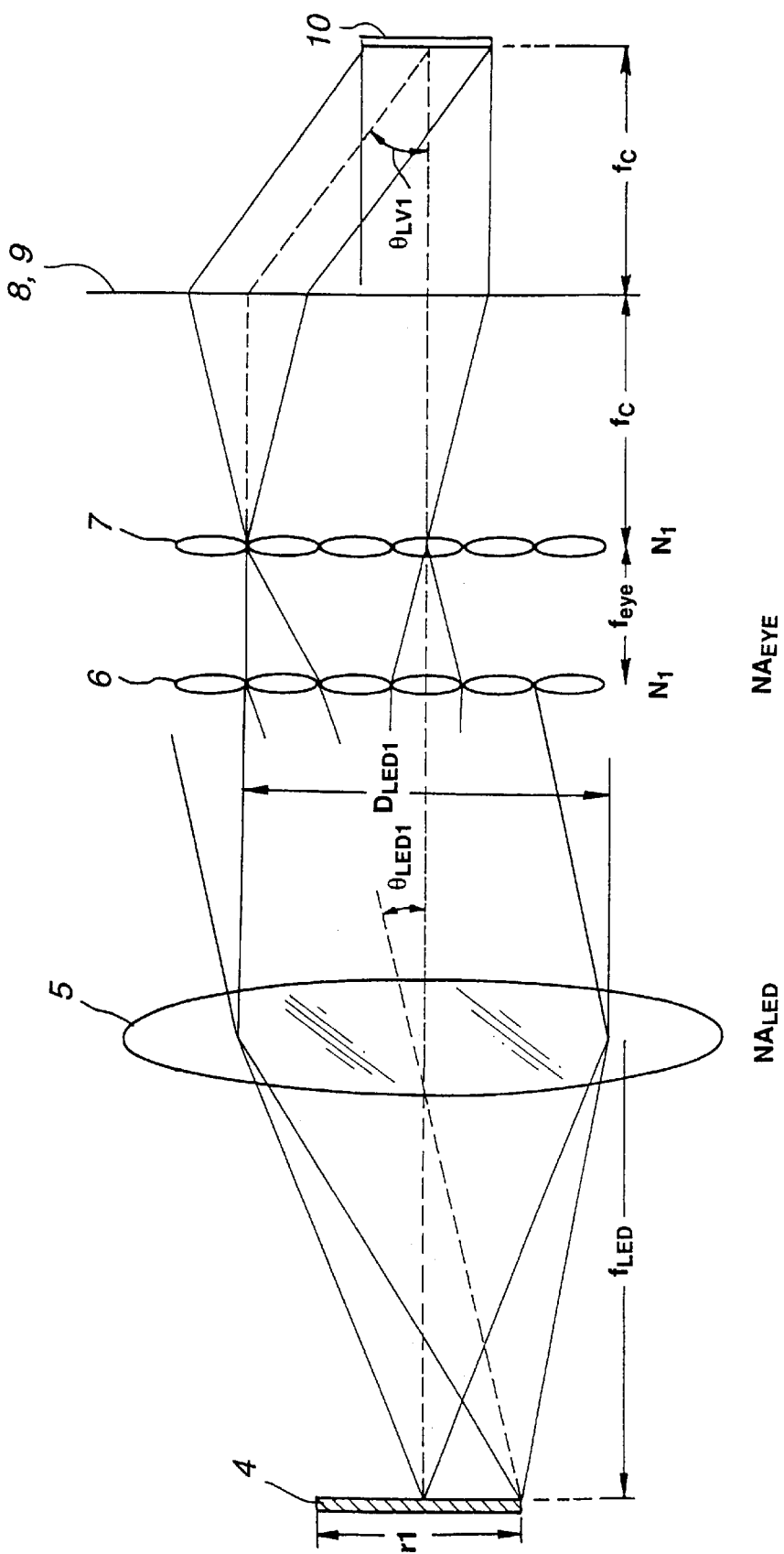
FIG. 5 is a schematic illustration of part of the lighting/optical system of an image display apparatus according to the invention, showing the geometrical relationship of the elements of the system.

Firstly, the geometrical relationship of one of the light emitting diode 4 and each of the related lenses will be discussed in terms of the direction of the short edges of the light valve 10 by referring to FIG. 5 showing part the lighting/optical system 2 in a simplified fashion.

If the effective numerical aperture of the coupling lens 5 is $NA_{LED}$, the light coupling efficiency $\eta_{LED}$ of the light emitting diode 4 is expressed by formula (1) below.

$$\eta_{LED} = NA_{LED}^2 \qquad (1)$$

If the length of the light emitting 4 is $r_1$ and the effective focal length of the coupling lens 5 is $f_{LED}$, the largest value that can be taken by the angle formed by extra-axial rays of light irradiating said light valve and the optical axis of the optical system is expressed by formula (2) below.

$$\theta_{LED1} = r_1/(2 \times f_{LED}) \qquad (2)$$

The exit pupil diameter $D_{LED1}$ for light transmitted through the coupling lens 5 is expressed by formula (3) below.

$$D_{LED1} = 2 \times NA_{LED} \times f_{LED} \qquad (3)$$

Thus, formula (4) below can be derived from the formulas (2) and (3) above.

$$D_{LED1} = (NA_{LED} \times r_1)/\theta_{LED1} \qquad (4)$$

On the other hand, if the number of element lenses of the fly eye lenses 6, 7 is $N_1$, the effective focal length of the fly eye lenses 6, 7 is $f_{EYE}$ and the effective numerical aperture of the fly eye lenses 6, 7 is $NA_{EYE1}$, the exit pupil diameter $D_{LED1}$ is expressed by formula (5) below.

$$D_{LED1} = 2 \times N_1 \times f_{EYE} \times NA_{EYE1} \qquad (5)$$

Furthermore, if the effective focal length, of the condenser lenses 8, 9 is $f_c$ and the largest value that can be taken by the angle formed by rays of light irradiating the light valve 10 and the optical axis of the optical system is $\theta_{LV1}$, the exit pupil diameter $D_{LED1}$ is expressed by formula (6) below.

$$D_{LED1} = 2 \times f_c \times \theta_{LV1} \qquad (6)$$

Then, if the length of the light valve 10 is $L_{LV1}$, the relationship among the length $L_{LV1}$ of the light valve 10, the effective numerical aperture $NA_{EYE1}$ of the fly eye lenses 6, 7 and the effective focal length fc of the condenser lenses 8, 9 is expressed by formula (7) below.

$$2 \times f_c \times NA_{EYE1} = L_{LV1} \qquad (7)$$

Thus, formula (8) below can be derived from the formulas (6) and (7) above.

$$NA_{EYE1} = (L_{LV1} \times \theta_{LV1})/D_{LED1} \qquad (8)$$

Likewise, formula (9) below can be derived from the formulas (4) and (8) above.

$$NA_{EYE1} = \theta_{LED1} \times \{(L_{LV1} \times \theta_{LV1})/(NA_{LED} \times r_1)\} \qquad (9)$$

Finally, formula (10) below can be derived from the formula (9) above.

$$\theta_{LED1}/NA_{EYE1} = (r_1/L_{LV1}) \times (NA_{LED}/\theta_{LV1}) \qquad (10)$$

Figure 6:
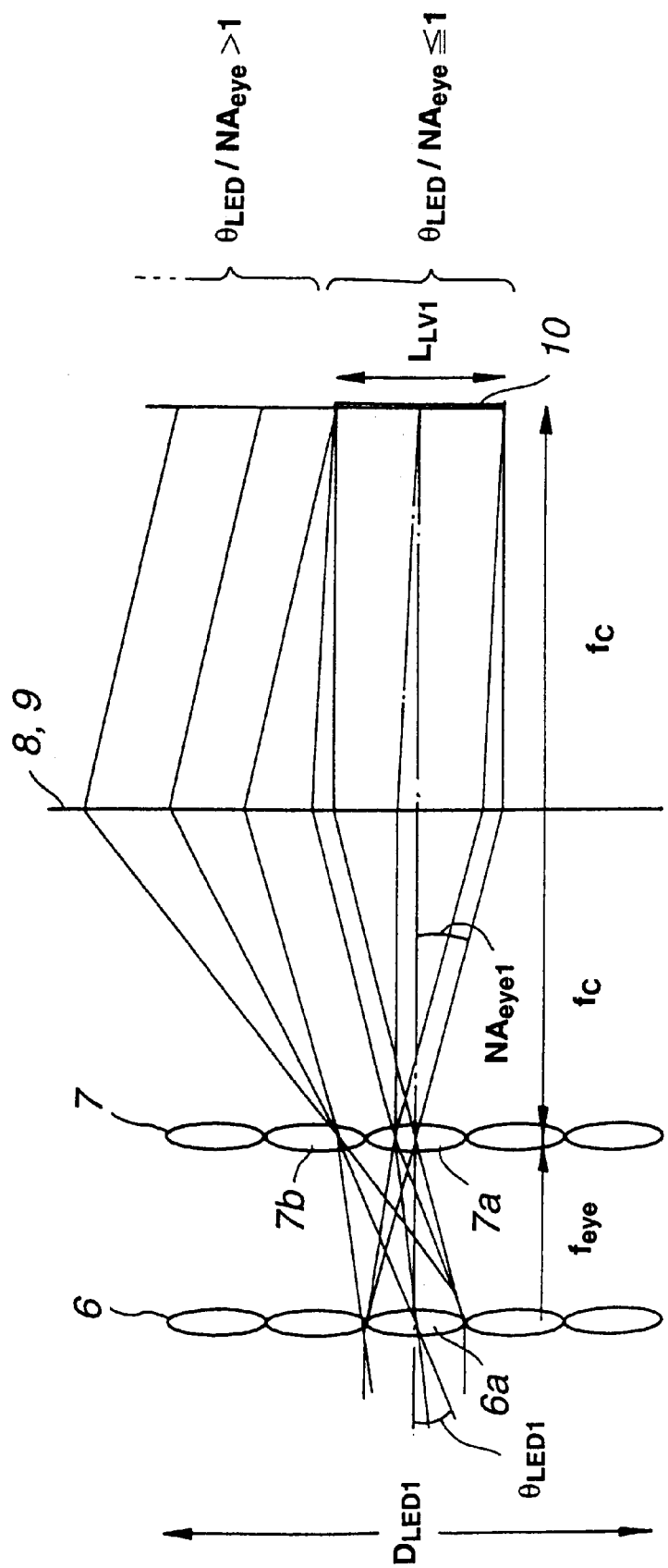
FIG. 6 is a schematic illustration of the light valves of an image display apparatus, showing the conditions to be met for irradiation of light.
Figure 7:
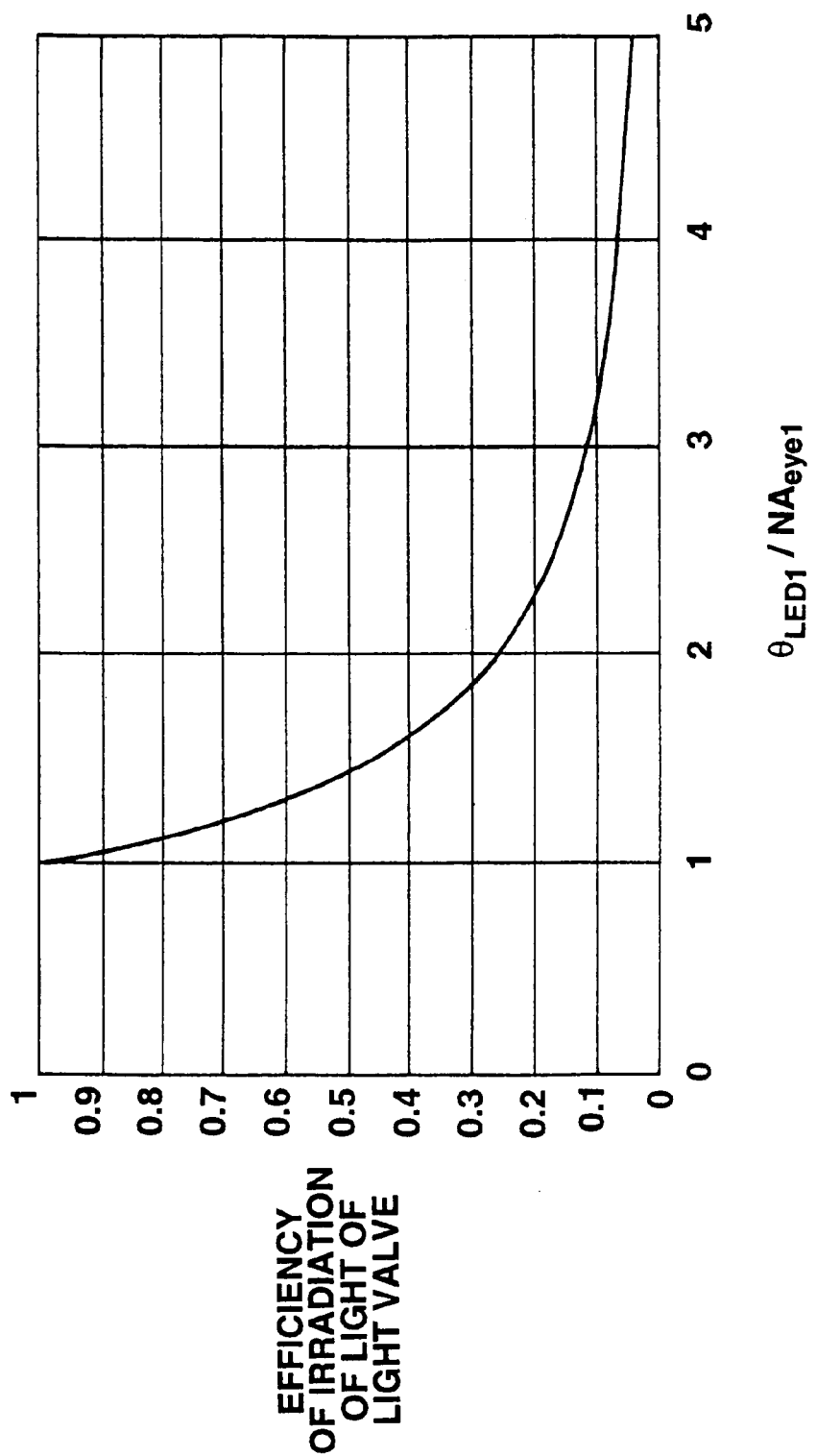
FIG. 7 is a graph showing the relationship between the ratio of $\theta_{LED1}/NA_{EYE1}$ and the efficiency of irradiation of light of a light valve.

The role of the second fly eye lens 7 is important when considering the conditions under which the light valve 10 is irradiated with light. Referring to FIG. 6, of the rays of light passing through component lens 6a of the first fly eye lens 7, those entering corresponding component lens 7a of the second fly eye lens 7 are then made to irradiate the light valve 10. However, of the rays of light passing through component lens 6a of the first fly eye lens 6, those entering component lens 7b of the second fly eye lens 7 located adjacent to the component lens 7a are not made to irradiate the light valve 10. FIG. 7 shows the relationship between the ratio of the angle of inclination $\theta_{LED1}$ of extra-axial rays to the effective numerical aperture $NA_{EYE1}$ of the fly eye lenses 6, 7 and the efficiency of irradiation of light of the light valve 10. As seen from FIG. 7, the efficiency of irradiation of light of the light valve 10 declines when the ratio of $\theta_{LED1}/NA_{EYE1}$ exceeds 1.

Therefore, it is desirable that light irradiating the light valve 10 satisfies the requirement of formula (11) below.

$$\theta_{LED1}/NA_{EYE1} \leq 1 \qquad (11)$$

In other words, all rays of light emitted from the light emitting diode 4 strike the light valve 10 when the requirement of $\theta_{LED1}/NA_{EYE1} \leq 1$ is met. On the other hand, however, some rays of light emitted from the light emitting diode 4 do not strike the light valve 10 to reduce the efficiency of irradiation of light when $\theta_{LED1}/NA_{EYE1} > 1$.

It will be appreciated that formula (12) below can be derived from the formulas (10) and (11) above.

$$r_1 \leq L_{LV1} \times (\theta_{LV1}/NA_{LED}) \qquad (12)$$

The formula (12) above is in fact a versional expression of Lagrange-Helmholtz's formula for the relationship between the size of an object and that of an image thereof. Thus, the efficiency of irradiation of light of the light valve 10 can be optimized in the direction along the short edges of the light valve 10 by selecting appropriate values that satisfy the requirement of formula (12) for the parameters of the lighting/optical system 2.

While the efficiency of irradiation of light of the light valve 10 is described above from the viewpoint of the direction of the short edges of the light valve 10, it will be appreciated that a similar statement applies to the efficiency of light irradiation of the light valve 10 in terms of the direction of the long edges of the light valve 10. Therefore, it is desirable that light irradiating the light valve 10 satisfies the requirement of formula (13) below in order to realized an enhanced efficiency of light irradiation of the light valve 10 along the direction of the long edges of the light valve 10.

$$r_2 \leq L_{LV2} \times (\theta_{LV2}/NA_{LED}) \qquad (13)$$

Thus, the efficiency of irradiation of light of the light valve 10 can be optimized in the direction along the long edges of the light valve 10 by selecting appropriate values that satisfy the requirement of formula (13) for the parameters of the lighting/optical system 2.

As will be clearly understood from the above description, for light emitted from each of the monochromatic light emitting diodes 4 to efficiently irradiate the light valve 10, the total surface area of the light emitting region of the light emitting diode is preferably not greater than $(L_{LV1} \times \theta_{LV1}/NA_{LED}) \times (L_{LV2} \times \theta_{LV2}/NA_{LED})$.

For example, in the case of a transmission type light valve, the largest values that can be take by the angles $\theta_{LV1}$ and $\theta_{LV2}$ formed by light irradiating the light valve 10 and the optical axis of the optical system are subjected to limitations attributable various factors of the display apparatus including the contrast of the liquid crystal and the angle of view of the projector lens in terms of both the direction of the short edges and that of the long edges of the light valve 10. In the case of a reflection type light valve, again, $\theta_{LV1}$ and $\theta_{LV2}$ are also subjected to limitations such as the incident angle dependency of the polarizing prism of the apparatus in terms of both the direction of the short edges and that of the long edges of the light valve 10. Thus, more often than not, the requirement of $\theta_{LV1} = \theta_{LV2}$ will have to be met. Additionally, since the effective numerical aperture $NA_{LED}$ normally takes a same value for both the direction of the short edges and that of the long edges of the light valve 10, the ratio of $r_1/r_2$ will agree with the ratio of $L_{LV1}/L_{LV2}$.

Thus, the light emitting region of the light emitting diode 4 has a contour similar to that of the light valve 10. When the light emitting region of the light emitting diode 4 has a contour similar to that of the light valve 10, rays of light that can be wasted will be minimized to consequently improve the efficiency of irradiation of light emitted from the light emitting diode 4.

Apart from the light emitting region of the light emitting diode 4, all the component lenses of the fly eye lenses 6, 7 preferably show a contour similar to that of the light valve 10 for the same reason. The efficiency of irradiation of light emitted from the light emitting diode will be improved when the component lenses of the fly eye lenses 6, 7 have a contour similar to that of the light valve 10.

The lengths $L_{LV1}$, $L_{LV2}$ defined above as those of the short and long edges of the above light valve 10 may alternatively be defined to be those of the short and long edges of the display area where images are actually displayed and hence the area that is to be illuminated. However, the illumination of light of the light valve can become uneven due to a number of factors including various aberrations. Then, if the lengths $L_{LV1}$, $L_{LV2}$ are defined as those of the short and long edges of the display were for the design of the lighting/optical system 2, unilluminated dark zones can appear along the periphery of the display area of the light valve 10. Additionally, margins such as an alignment margin and a dimensional margin will have to be taken into consideration particularly for the manufacturing process. All in all, the region of the light valve 10 to be irradiated with light is preferably made slightly larger than the display area for actually displaying images.

Thus, in the above described embodiment of image display apparatus according to the invention, it is desirable that the display area of the light valve 10 has short edges not longer than $L_{LV1}$ and long edges not longer than $L_{LV2}$. Then, as a result, the area of the light valve 10 to be irradiated with light will be dimensionally slightly greater than the display area of the light valve 10 where images are actually displayed. By selecting values for the dimensions of the area to be irradiated with light of the light valve 10 slightly greater than those of the dimensions of the display area, the entire surface of the display area will be evenly and uniformly irradiated with light if errors arise due to aberrations of the optical system and misalignment of some of the components in the manufacturing process.

When selecting values for the dimensions of the area to be irradiated with light of the light valve 10 slightly greater than those of the dimensions of the display area, it is preferable that the length $L_{LV1}$ of the short edges and the length $L_{LV2}$ of the long edges of the area to be irradiated with light of the light valves are respectively greater than the length of the short edges and the length of the long edges of the display area of each of the light valves by 2 to 50%, taking aberrations of the optical system and margins such as an alignment margin and a dimensional margin in the manufacturing process into consideration. Then, the entire surface of the display area will be evenly and uniformly irradiated with light if errors arise due to aberrations of the optical system and misalignment of some of the components in the manufacturing process.

Figure 8:
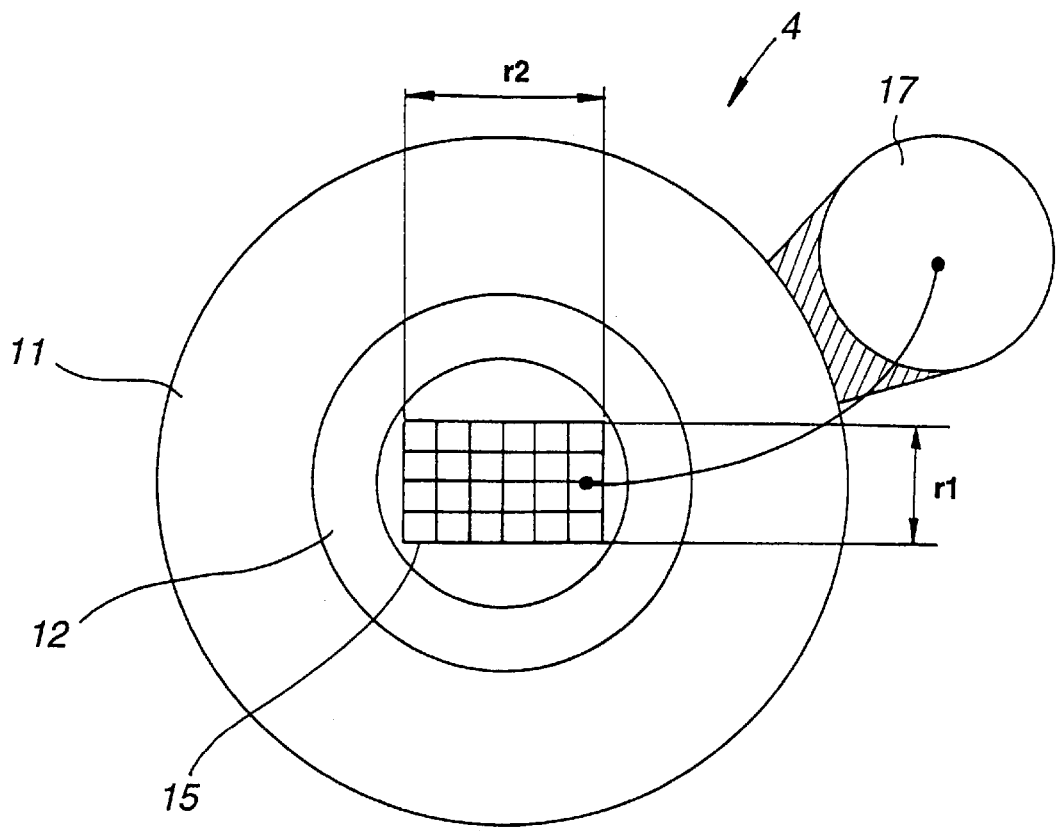
FIG. 8 is a schematic plan view of a light emitting diode that can be used for an image display apparatus according to the invention, showing its schematic configuration.
Figure 9:
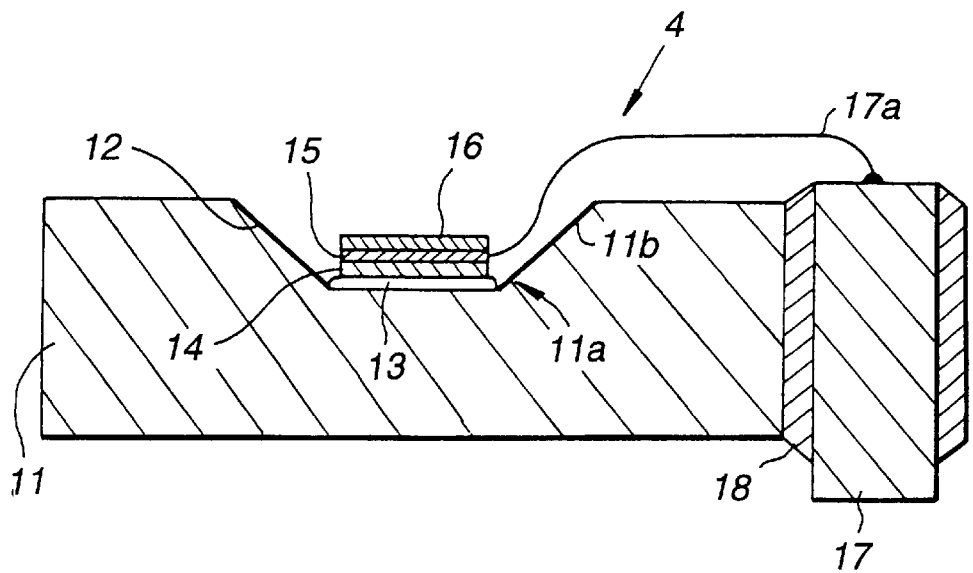
FIG. 9 is a schematic cross sectional view of the light emitting diode of FIG. 8.

FIGS. 8 and 9 schematically illustrate a light emitting diode 4 that can be used for an image display apparatus according to the invention, showing its configuration. FIG. 8 is a schematic plan view of the light emitting diode 4 and FIG. 9 is a schematic cross sectional view of the light emitting diode 4. The light emitting diode 4 comprises a metal substrate 11, a reflector plate 12, an adhesive layer 13, a light emitting material layer 14, a metal electrode 15, a transparent electrode 16 and a lead pin 17.

The metal substrate 11 is typically disk-shaped and has a circular recess 11a at the center thereof. The top surface of the metal substrate 11 and the bottom surface of the recess 11a are linked by a slope 11b and the reflector plate 12 is formed on the slope 11b.

The adhesive layer 13, the light emitting material layer 14, the network of the metal electrode 15 and the transparent electrode 16 typically made of ITO are laid sequentially on the bottom surface of the recess 11a in the above mentioned order.

By using a network for the metal electrode 15, an even and uniform current distribution can be ensured over the entire surface of the transparent electrode 16. Alternatively, the transparent electrode 16 may be arranged directly on the light emitting material layer 14. Then, the network of metal electrode 15 will be arranged on the transparent electrode 16. The metal electrode 15 is connected to the lead pin 17 located adjacent to the metal substrate 11 by way of a lead wire 17a. The lead pin 17 is electrically isolated from the metal substrate 11 by an insulation layer 18.

The light emitting diode 4 operating as light source of the image display apparatus is typically made of a compound semiconductor as will be described below.

If the light source of an image display apparatus according to the invention comprises a light emitting diode adapted to emit red light, it is preferably made of a compound semiconductor selected from a group of compounds of the GaP type including GaAlAs, GaAsP and AlGaPAs, a group of GaAs type compounds and that of AlAs type compounds.

If, on the other hand, the light source of an image display apparatus according to the invention comprises a light emitting diode adapted to emit green light, it is preferably made of a compound semiconductor selected from a group of compounds of the GaN type including InGaN and AlInGaN and a group of ZnSe type compounds.

If, finally, the light source of an image display apparatus according to the invention comprises a light emitting diode adapted to emit blue light, it is preferably made of a compound semiconductor selected from a group of compounds of the GaN type including InGaN and AlInGaN, a group of ZnSeN type compounds and that of SiC type compounds.

The light emitting region of the light emitting diode 4 is substantially rectangularly parallelepipedic and has short edges with a length of r1 and long edges with a length of r2. The light emitting region of the light emitting diode 4 preferably has a contour similar to that of the light valve 10. If the light emitting region of the light emitting diode 4 has a contour similar to that of the light valve 10, rays of light that can be wasted will be minimized to consequently improve the efficiency of irradiation of light emitted from the light emitting diode 4.

Figure 10:
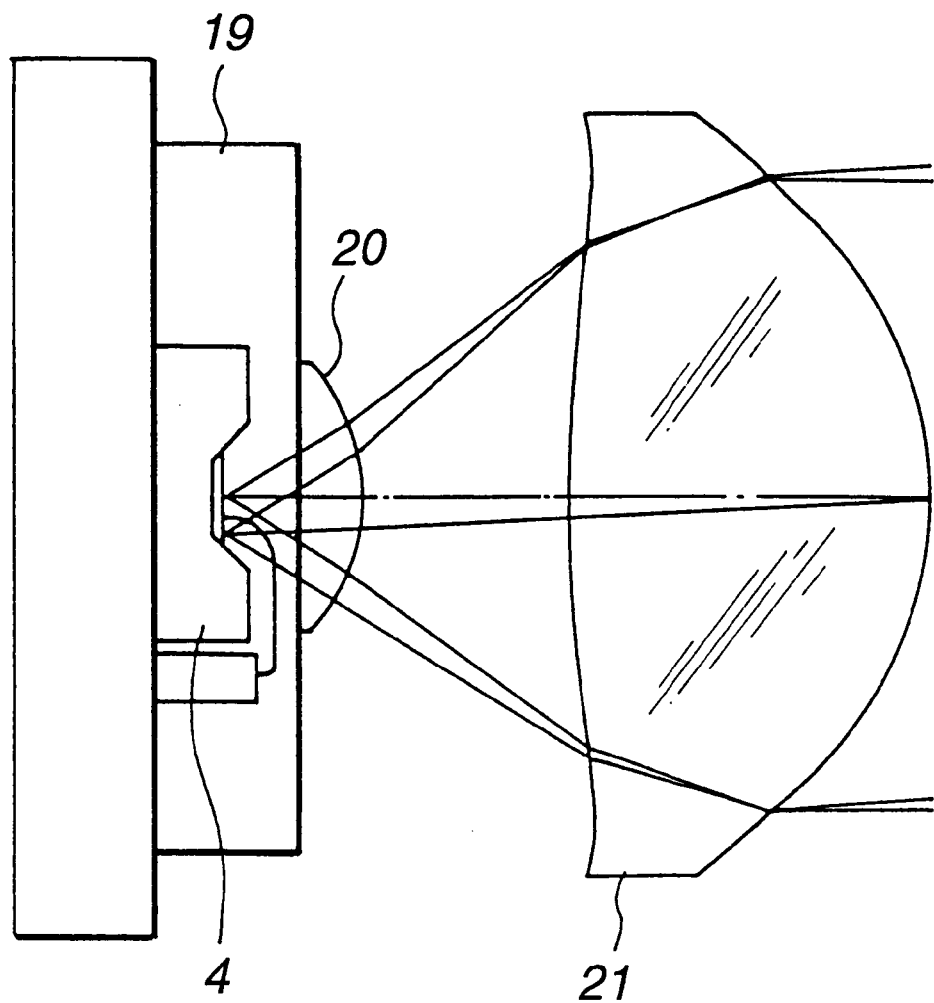
FIG. 10 is a schematic plan view of a light emitting diode that can be used for an image display apparatus according to the invention, showing its schematic configuration that is different from that of FIG. 9.

Referring now to FIG. 10, for the purpose of the present invention, the light emitting diode 4 may be covered by a highly transparent resin material 19 having a large refractive index and a spherical lens 20 and a coupling lens 21 may be arranged in front of it. The numerical aperture of the lenses can by raised when the light emitting diode 4 is covered by a highly transparent resin material 19 having a large refractive index and a spherical lens 2 and a coupling lens 21 are arranged in front of it.

In an image display apparatus according to the invention, the light source may include a plurality of light emitting devices.

Figure 11:
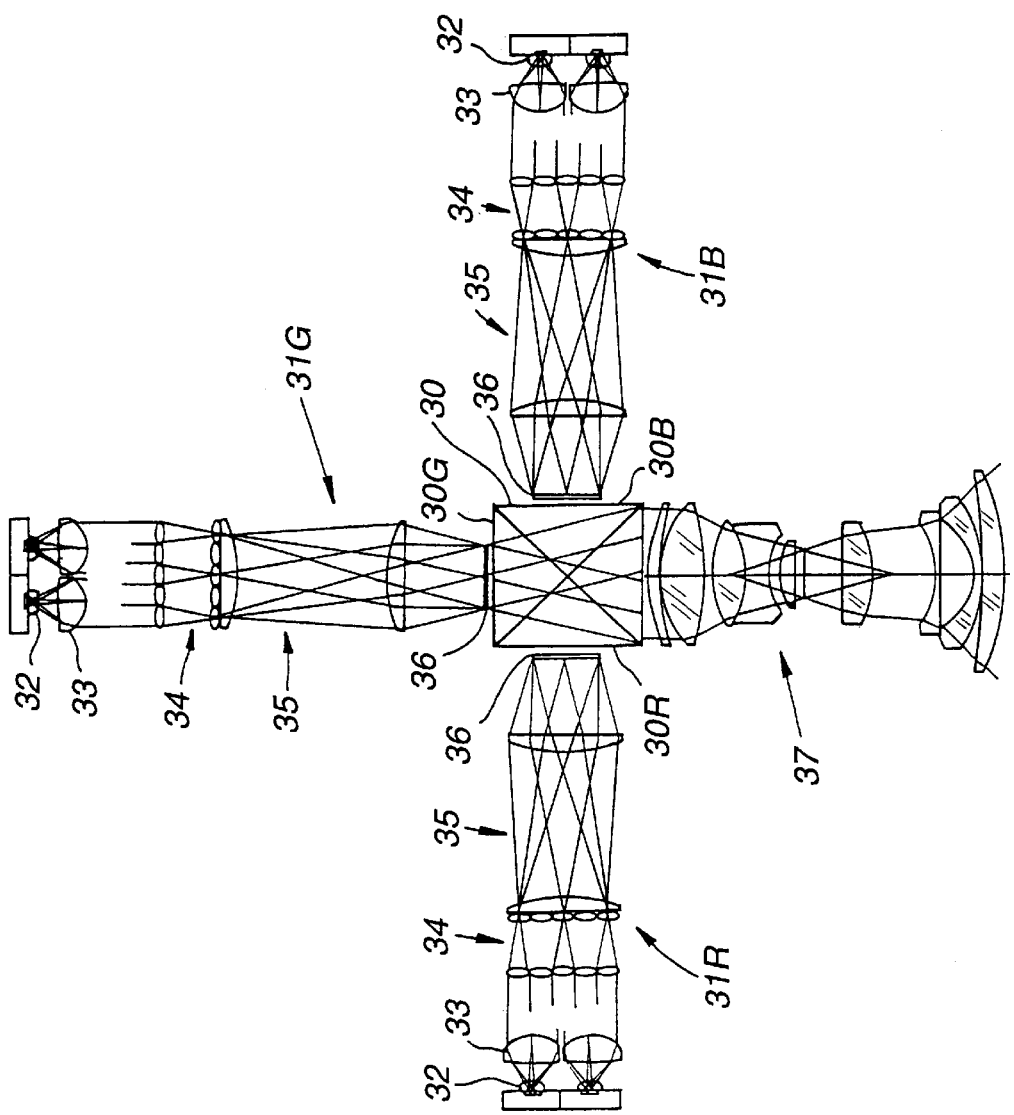
FIG. 11 is a schematic illustration of another embodiment of image display apparatus according to the invention, showing its schematic configuration.

FIG. 11 is a schematic illustration of an embodiment of image display apparatus according to the invention and comprising a plurality of light emitting diodes for the light sources. The embodiment of image display apparatus of FIG. 11 comprises a cuboidal dichroic mirror 30, an lighting/optical system for green light 31G arranged vis-a-vis a surface 30G of the dichroic mirror 30, an lighting/optical system for red light 31R arranged vis-a-vis a surface 30R of the dichroic mirror 30 perpendicular to the surface 30G and a lighting/optical system for blue light 31B arranged vis-a-vis a surface 30B of the dichroic mirror 30 parallel to the surface 30R.

This embodiment of image display apparatus according to the invention additionally comprises a projector lens 37 arranged vis-a-vis the surface of the dichroic mirror 30 that is parallel to the surface 30G. The projector lens 37 is adapted to project light for the image produced by color synthesis of rays of light emitted from the lighting/optical systems 31G, 31R, 31B by means of the dichroic mirror 30 onto a transmission type or reflection type screen (not shown).

Each of the illustrated lighting/optical systems 31 (as representative of 31G, 31R, 31B) comprises a light emitting diode 32 operating as light source, a plurality of coupling lenses 33, a fly eye lens 34, a condenser lens 35 and a light valve 36 arranged in the above mentioned order, the light valve 35 being arranged vis-a-vis the corresponding surface of the dichroic mirror 30.

Figure 12:
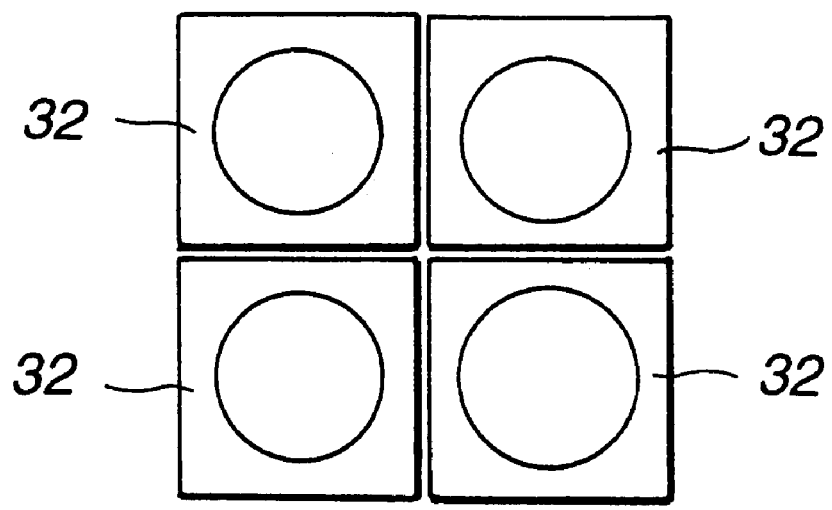
FIG. 12 is a view of one of the light sources of the image display apparatus of FIG. 11, showing the light emitting side thereof.

While the image display apparatus of FIG. 11 has a configuration same as that of the image display apparatus of FIG. 3, a plurality of light emitting diodes 32 are used for each of the light sources. FIG. 12 is a view of one of the light sources of the image display apparatus as viewed from the light emitting side thereof. As shown in FIG. 12, the light source comprises a total of four light emitting diodes 32 arranged in two paired rows. Thus, according to the invention, a plurality of light emitting diodes 32 are arranged two-dimensionally and a same number of coupling lenses 33 are arranged vis-a-vis the respective light emitting diodes 32. Any number of light emitting diodes may be used in the lighting/optical system for the purpose of the invention. The intensity of light emitted from the light source is the sum of the intensity of light emitted from each of the light emitting diodes 32.

In an image display apparatus according to the invention and comprising a plurality of light emitting diodes for each of the light sources, preferably, the total surface area of the light emitting regions of the light emitting diodes of each primary color is not greater than $(L_{LV1} \times \theta_{LV1}/NA_{LED}) \times (L_{LV2} \times \theta_{LV2}/NA_{LED})$. Still preferably, the light emitting region of each of said light emitting diodes has a contour similar to that of the light valves. Since the contour of the surface area of each of the light valves irradiated with light mainly depends on the contour of the light emitting region of each individual light emitting diode, the mode or arrangement of the two-dimensionally arranged light emitting diodes is not important. For example, a total of four light emitting diodes may be arranged in a single row.

The present invention is equally applicable to both an image display apparatus comprising transmission type light valves and an image display apparatus comprising reflection type light valves.

Figure 13:
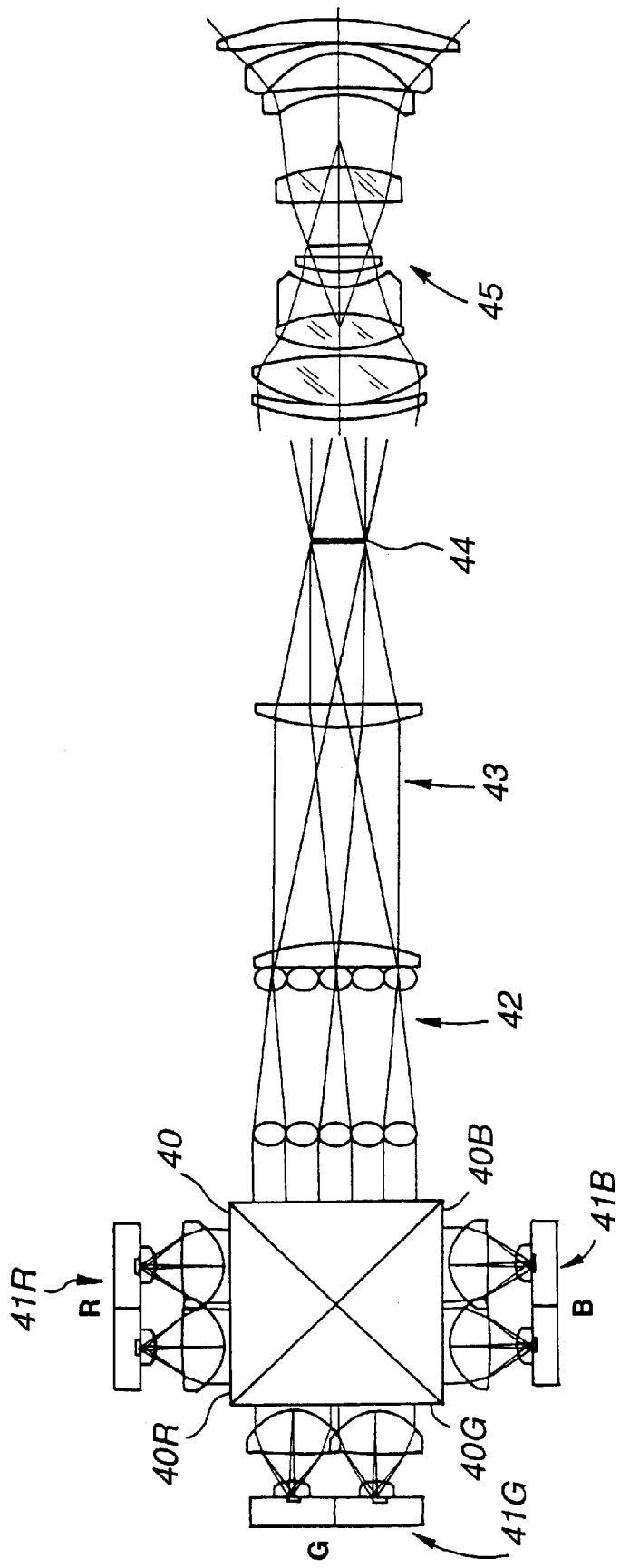
FIG. 13 is a schematic illustration of still another embodiment of image display apparatus according to the invention, showing its schematic configuration.

FIG. 13 is a schematic illustration of still another embodiment of image display apparatus according to the invention and comprising a single plate transmission type light valve so that the process of color synthesis takes place in front of the integrator of the lighting/optical systems.

This embodiment of image display apparatus comprises a cuboidal dichroic mirror 40, a green light emitting diode unit 41G arranged vis-a-vis a surface 40G of the dichroic mirror 40, a red light emitting diode unit 41R arranged vis-a-vis a surface 40R of the dichroic mirror 40 perpendicular to the surface 40G and a blue light emitting diode unit 41B arranged vis-a-vis a surface 40B of the dichroic mirror 40 parallel to the surface 40R. Each of the light emitting diode units 41R, 41G, 41B comprises a light source having a plurality of light emitting diodes and a same number of coupling lenses arranged in front of the respective light emitting diodes.

This embodiment of image display apparatus according to the invention additionally comprises an integrator 42 arranged vis-a-vis the surface of the dichroic mirror 40 parallel to the surface 40G, a condenser lens 43, a light valve 44 and a projector lens 45.

With the embodiment of image display apparatus illustrated in FIG. 13, red light, green light and light emitting emitted respectively from the light emitting diode units 41R, 41G, 41B enter the dichroic mirror 40, where they are subjected to a process of color synthesis. Color-synthesized light is then irradiated onto the light valve 44 by way of the integrator 42 and the condenser lens 43. Light that enters the light valve 44 is spatially modulated by the latter before it passes through the light valve 44 and projected onto a screen by way of the projector lens 45.

Figure 14:
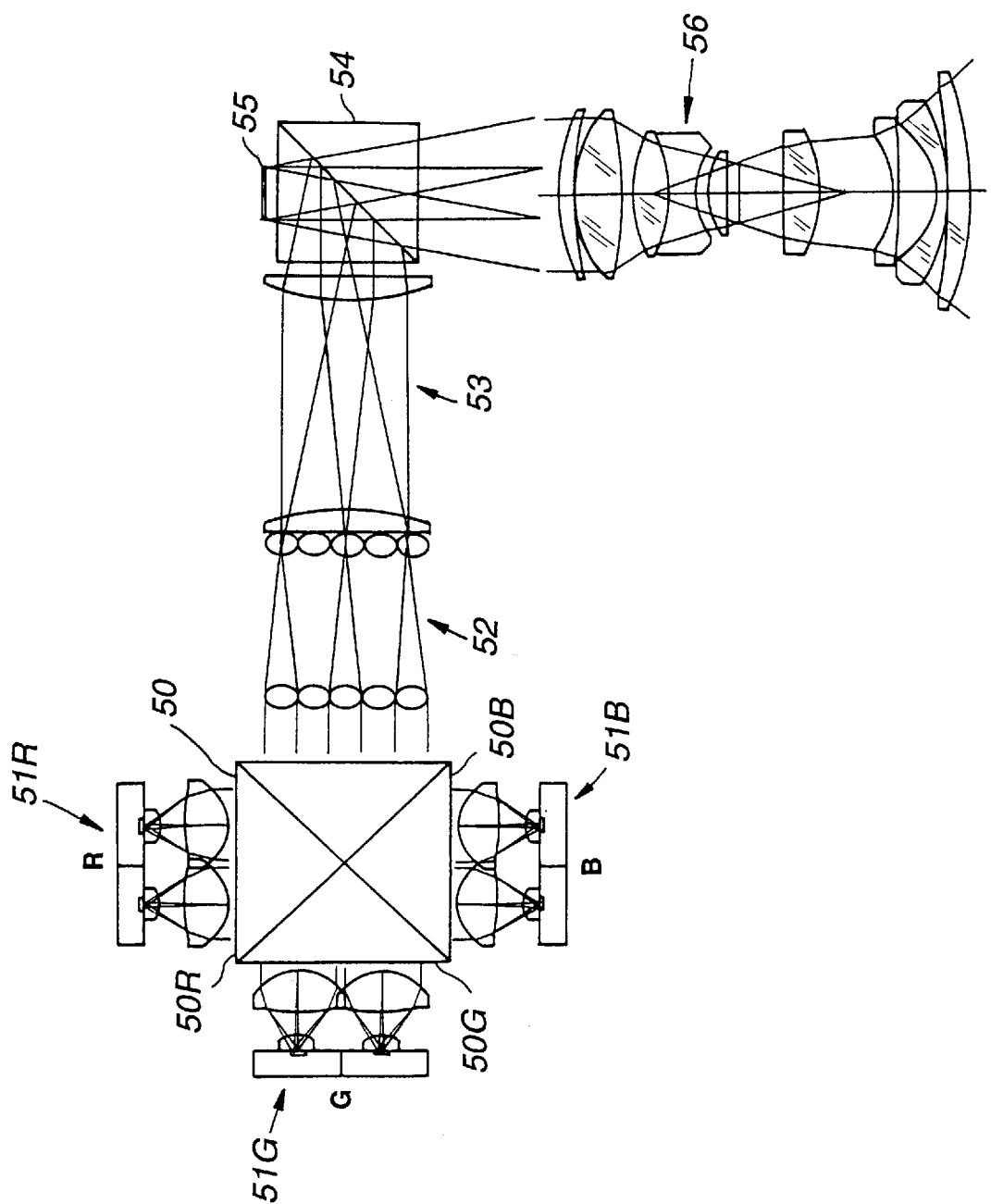
FIG. 14 is a schematic illustration of still another embodiment of image display apparatus according to the invention, showing its schematic configuration.

FIG. 14 is a schematic illustration of still another embodiment of image display apparatus according to the invention and comprising single plate reflection type light valves so that the process of color synthesis takes place in front of the integrator of the lighting/optical systems.

This embodiment of image display apparatus comprises a cuboidal dichroic mirror 50, a green light emitting diode unit 51G arranged vis-a-vis a surface 50G of the dichroic mirror 50, a red light emitting diode unit 41R arranged vis-a-vis a surface 5OR of the dichroic mirror 50 perpendicular to the surface 50G and a blue light emitting diode unit 51B arranged vis-a-vis a surface 50B of the dichroic mirror 50 parallel to the surface 50R. Each of the light emitting diode units 51R, 51G, 51B comprises a light source having a plurality of light emitting diodes and a same number of coupling lenses arranged in front of the respective light emitting diodes.

This embodiment of image display apparatus according to the invention additionally comprises an integrator 52 arranged vis-a-vis the surface of the dichroic mirror 50 parallel to the surface 50G, a condenser lens 53, a polarizing beam splitter 54, a light valve 55 arranged on the light path of light reflected by the polarizing beam splitter 54 and a projector lens 56 arranged by turn on the light path of light reflected by the light valve 55.

With the embodiment of image display apparatus illustrated in FIG. 14, red light, green light and light emitting emitted respectively from the light emitting diode units 51R, 51G, 51B enter the dichroic mirror 50, where they are subjected to a process of color synthesis. Color-synthesized light then enters the polarizing beam splitter 54 by way of the integrator 52 and the condenser lens 53.

Of the light that enters the polarizing beam splitter 54, only the fraction thereof, or S-polarized light, that is polarized in the direction perpendicular to the plane of incidence is reflected by the plane of reflection of the polarizing beam splitter 54 and enters the light valve 55. The reflection type light valve 55 modifies the state of polarization of incident light for each of the pixels according to the image to be displayed and reflects it toward the polarizing beam splitter 54. Of the light reflected by the light valve 55, the fraction thereof, or P-polarized light, that is polarized in the direction parallel to the plane of incidence passes the polarizing beam splitter 54 and enters the projector lens 56, which projects it onto the screen.

With either of the image display apparatus illustrated in FIGS. 13 and 14, for light emitted from each of the monochromatic light emitting diodes 4 to efficiently irradiate the light valve 10, the total surface area of the light emitting region of the light emitting diode is preferably not greater than $(L_{LV1} \times \theta_{LV1}/NA_{LED}) \times (L_{LV2} \times \theta_{LV2}/NA_{LED})$.

The present invention is also applicable to an image display apparatus adapted to polarization mode conversion.

Figure 15:
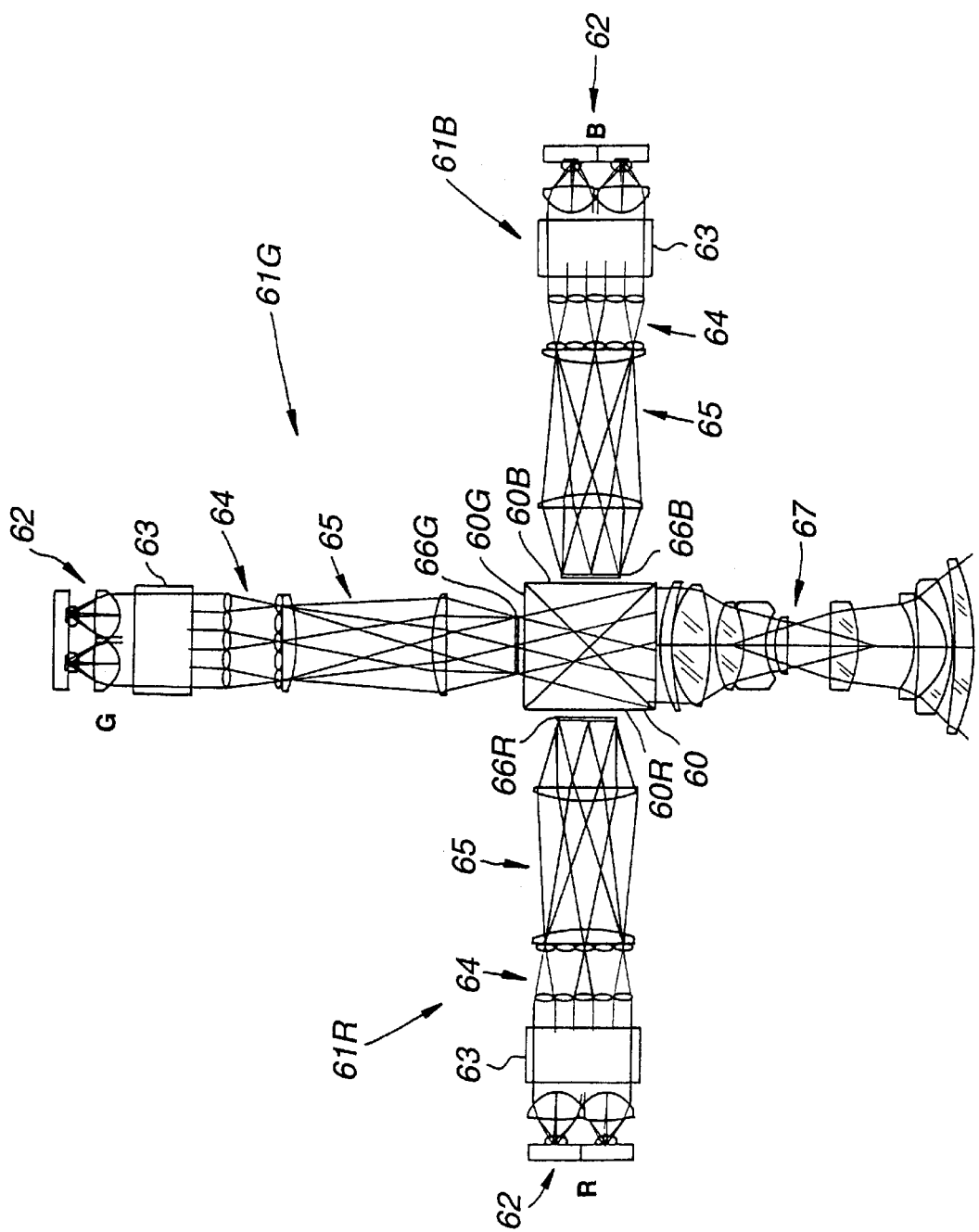
FIG. 15 is a schematic illustration of still another embodiment of image display apparatus according to the invention, showing its schematic configuration.

FIG. 15 is a schematic illustration of still another embodiment of image display apparatus according to the invention that comprises three transmission type light valves and adapted for polarization mode conversion.

The embodiment of image display apparatus of FIG. 15 comprises a cuboidal dichroic mirror 60, an lighting/optical system for green light 61G arranged vis-a-vis a surface 60G of the dichroic mirror 60, an lighting/optical system for red light 6 1R arranged vis-a-vis a surface 60R of the dichroic mirror 60 perpendicular to the surface 30G, a lighting/optical system for blue light 61B arranged vis-a-vis a surface 60B of the dichroic mirror 60 parallel to the surface 60R and a projector lens 67 arranged visa-vis the surface of the dichroic mirror 30 that is parallel to the surface 60G.

Each of the illustrated lighting/optical systems 61 (as representative of 61G, 61R, 61B) comprises a light emitting diode unit 62, a polarization mode conversion means 63, an integrator 64, a condenser lens 65 and a light valve 66 arranged in the above mentioned order, the light valve 66 being disposed vis-a-vis the corresponding surface of the dichroic mirror 60. The light emitting diode unit 62 includes a plurality of light emitting diodes operating as light source and a same number of coupling lenses, each being arranged in front of the corresponding light emitting diode.

Figure 16:
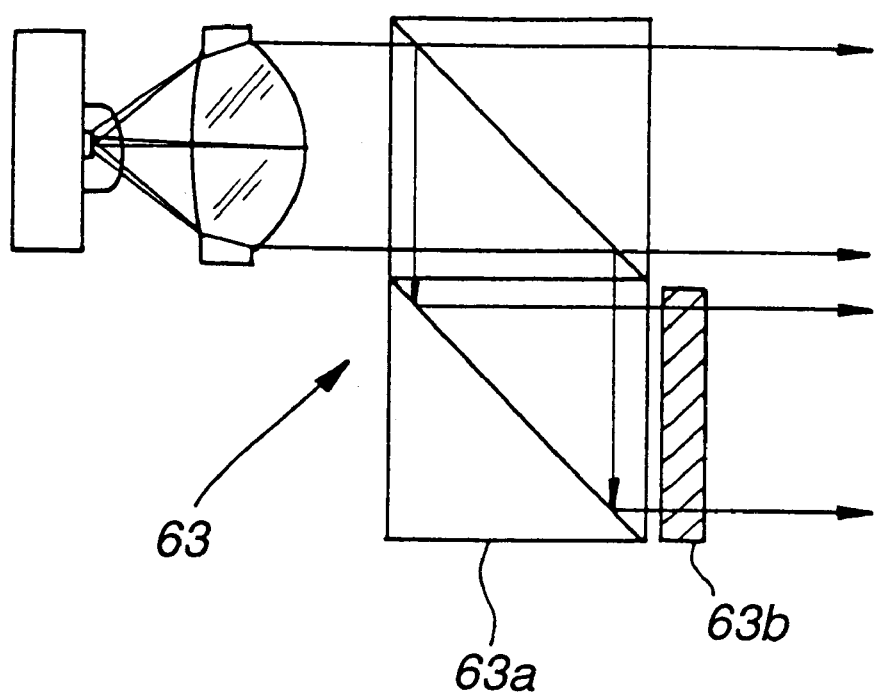
FIG. 16 is a schematic illustration of a deflection converting means that can be used for an image display apparatus according to the invention, showing its schematic configuration.

With the embodiment of image display apparatus illustrated in FIG. 15, light emitted from each of the light emitting diode unit 62 enters the polarization mode conversion means 63. The polarization mode conversion means typically has a polarizing beam splitter 63a and a half wavelength plate 63b as shown in FIG. 16.

Light that hits the polarization mode conversion 63 firstly enters the polarizing beam splitter 63a. Of the light that enters the polarizing beam splitter 63a, only the fraction thereof, or S-polarized light, that is polarized in the direction perpendicular to the plane of incidence is reflected by the plane of reflection of the polarizing beam splitter 63a and enters the half wavelength plate 63b, which rotates the plane of polarization of incident light. On the other hand, of the light that enters the polarizing beam splitter 63a, the fraction thereof, or P-polarized light, that is polarized in the direction parallel to the plane of incidence is transmitted through the polarizing beam splitter 63a to move further forward. Light subjected to polarization mode conversion by the polarization mode conversion means 63 is then made to irradiate the light valve 66 by way of the integrator 64 and the condenser lens 65 as shown in FIG. 15.

This embodiment of image display apparatus comprises a total of three light valves, including a light valve for red light 66R, a light valve for green light 66G and a light valve for blue light 66B. Thus, red light, green light and blue light made to strike the respective light valves 66R, 66G, 66B are spatially modulated by the respective light valves 66R, 66G, 66B. Then, after passing through the respective light valves 66R, 66G, 66B, spatially modulated red light, green light and blue light enter the dichroic mirror 60, where they are subjected to a process of color synthesis and then projected onto the screen by means of the projector lens 67 as synthesized light.

Figure 17:
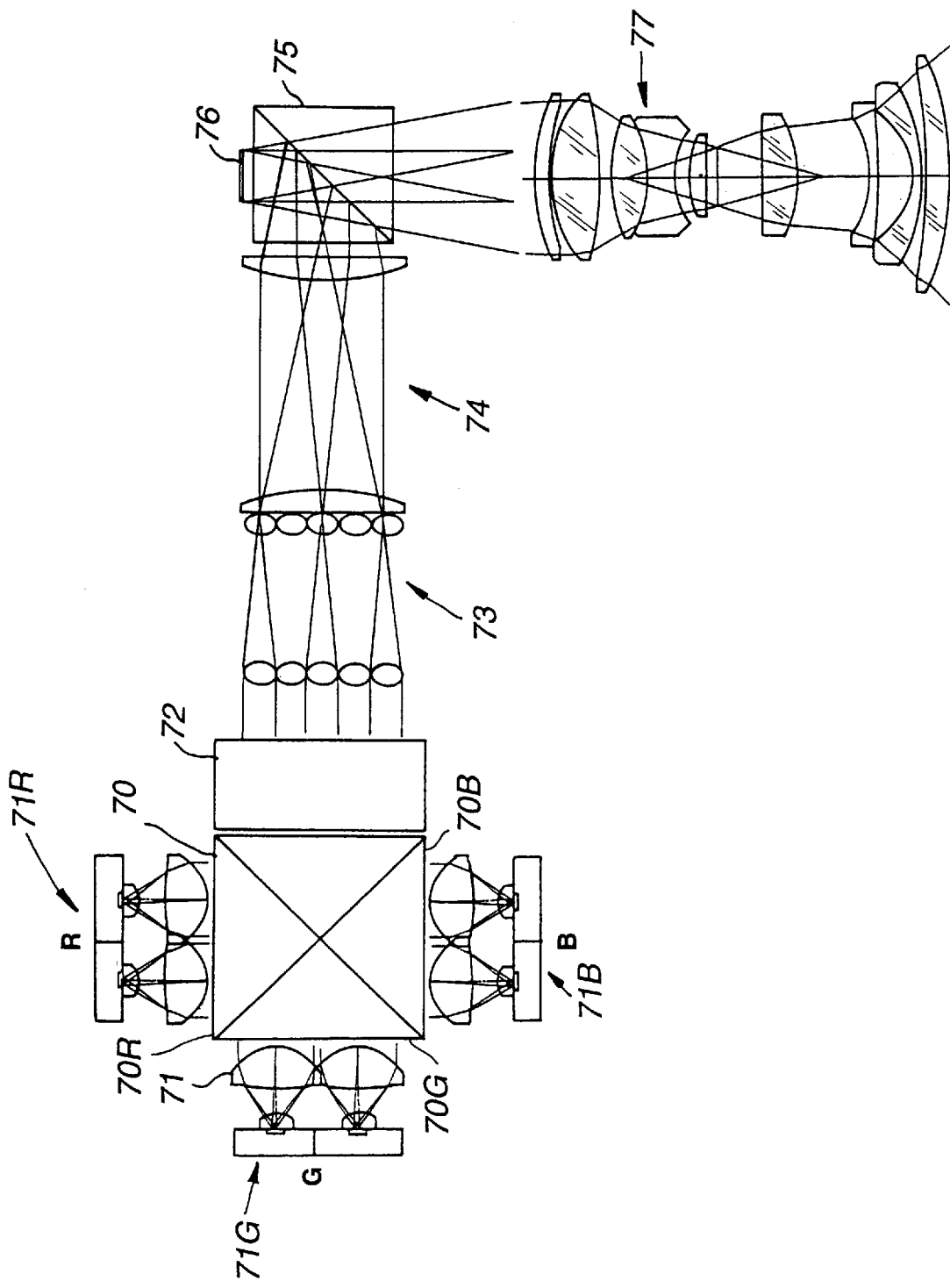
FIG. 17 is a schematic illustration of still another embodiment of image display apparatus according to the invention, showing its schematic configuration.

FIG. 17 is a schematic illustration of still another embodiment of image display apparatus according to the invention that comprises a single plate reflection type light valve and adapted for polarization mode conversion.

This embodiment of image display apparatus comprises a cuboidal dichroic mirror 70, a green light emitting diode unit 71G arranged vis-a-vis a surface 70G of the dichroic mirror 70, a red light emitting diode unit 71R arranged vis-a-vis a surface 70R of the dichroic mirror 70 perpendicular to the surface 70G and a blue light emitting diode unit 71B arranged vis-a-vis a surface 70B of the dichroic mirror 70 parallel to the surface 70R. Each of the light emitting diode units 71R, 71G, 71B comprises a light source having a plurality of light emitting diodes and a same number of coupling lenses arranged in front of the respective light emitting diodes.

This embodiment of image display apparatus according to the invention additionally comprises a polarization mode conversion means 72 arranged vis-a-vis the surface of the dichroic mirror 70 parallel to the surface 70G, an integrator 72, a condenser lens 74, a polarizing beam splitter 75, a light valve 76 arranged on the light path of light reflected by the polarizing beam splitter 75 and a projector lens 77 arranged on the light path of light reflected by the light valve 76.

With the embodiment of image display apparatus illustrated in FIG. 17, red light, green light and light emitting emitted respectively from the light emitting diode units 71R, 71G, 71B enter the dichroic mirror 70, where they are subjected to a process of color synthesis. Color-synthesized light is then made to enter the polarization mode conversion means 72 typically including a light valve and a half wavelength plate, where it is subjected to a process of polarization mode conversion. Light subjected to the process of polarization mode conversion is then made to enter the polarizing beam splitter 75 by way of the integrator 73 and the condenser lens 74.

Of the light that enters the polarizing beam splitter 75, only the fraction thereof, or S-polarized light, that is polarized in the direction perpendicular to the plane of incidence is reflected by the plane of reflection of the polarizing beam splitter 75 and enters the light valve 76. The reflection type light valve 76 modifies the state of polarization of incident light for each of the pixels according to the image to be displayed and reflects it toward the polarizing beam splitter 75. Of the light reflected by the light valve 77, the fraction thereof, or P-polarized light, that is polarized in the direction parallel to the plane of incidence passes the polarizing beam splitter 75 and enters the projector lens 77, which projects it onto the screen.

Figure 18:
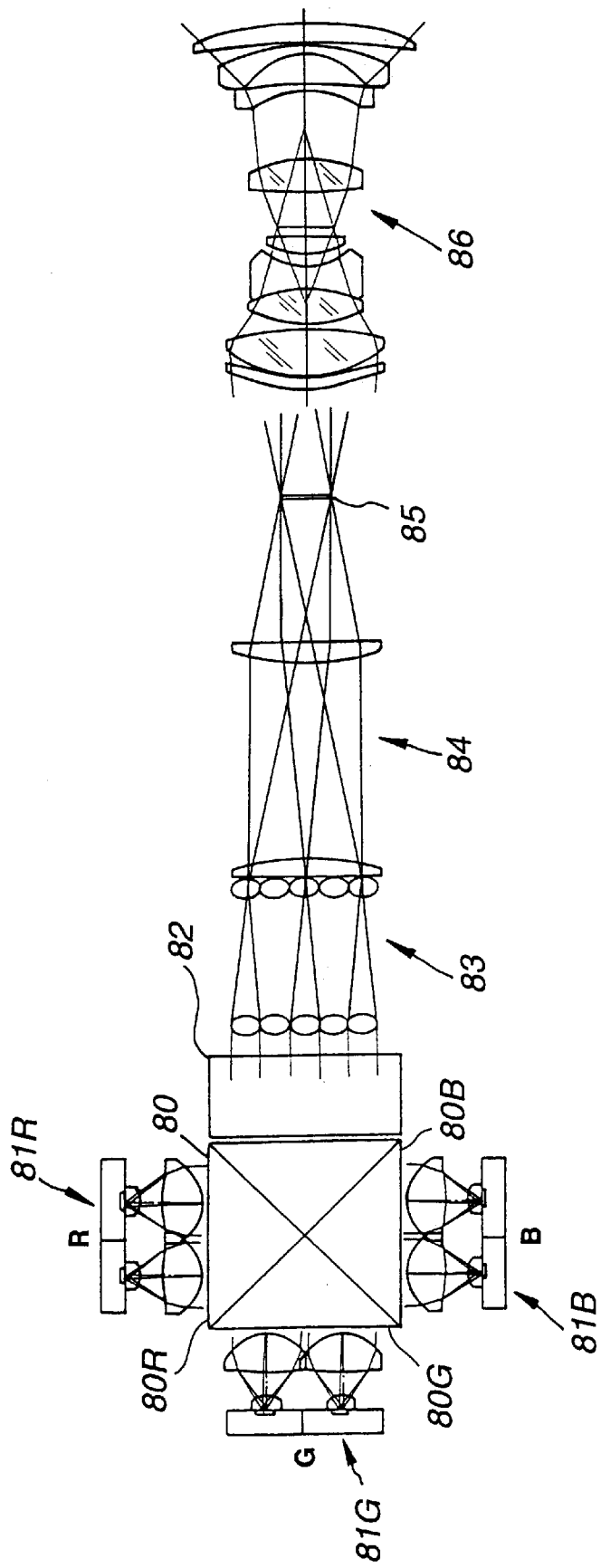
FIG. 18 is a schematic illustration of still another embodiment of image display apparatus according to the invention, showing its schematic configuration.

FIG. 18 is a schematic illustration of still another embodiment of image display apparatus according to the invention that comprises a single plate transmission type light valve and adapted for polarization mode conversion.

This embodiment of image display apparatus comprises a cuboidal dichroic mirror 80, a green light emitting diode unit 81G arranged vis-a-vis a surface 80G of the dichroic mirror 80, a red light emitting diode unit 81R arranged vis-a-vis a surface 80R of the dichroic mirror 80 perpendicular to the surface 80G and a blue light emitting diode unit 81B arranged vis-a-vis a surface 80B of the dichroic mirror 80 parallel to the surface 80R. Each of the light emitting diode units 81R, 81G, 81B comprises a light source having a plurality of light emitting diodes and a same number of coupling lenses arranged in front of the respective light emitting diodes.

This embodiment of image display apparatus according to the invention additionally comprises a polarization mode conversion means 82 arranged vis-a-vis the surface of the dichroic mirror 80 parallel to the surface 80G, an integrator 82, a condenser lens 84, a light valve 85 and a projector lens 86.

With the embodiment of image display apparatus illustrated in FIG. 18, red light, green light and light emitting emitted respectively from the light emitting diode units 81R, 81G, 81B enter the dichroic mirror 80, where they are subjected to a process of color synthesis. Color-synthesized light is then made to enter the polarization mode conversion means 82 typically including a light valve and a half wavelength plate, where it is subjected to a process of polarization mode conversion. Light subjected to the process of polarization mode conversion is then made to enter the light valve 85 by way of the integrator 84 and the condenser lens 84. Light that enters the light valve 85 is spatially modulated by the light valve 85 and then projected on the screen by means of the projector lens 86.

With either of the image display apparatus illustrated in FIGS. 17 and 18, light is split into two fluxes of light as a result of polarization mode conversion so that apparently it comprises twice as many light emitting diodes as it actually has. Thus, with the embodiments of image display apparatus illustrated in FIGS. 15, 17 and 18, for light emitted from each of the monochromatic light emitting diodes to efficiently irradiate the light valve, the total surface area of the light emitting region of the light emitting diode is preferably not greater than $(L_{LV1} \times \theta_{LV1}/NA_{LED}) \times (L_{LV2} \times \theta_{LV2}/NA_{LED})$. Additionally, the light emitting region of each of the light emitting diodes preferably has a contour similar to that of the light valves.

The total surface area of the light emitting regions of the light emitting diodes can be reduced by half to consequently reduce the overall dimensions of the image display apparatus when the technique of polarization mode conversion is employed. Additionally, a same level of brightness can be produced with a power consumption rate that is only a half of that of an apparatus that does not employ the technique of polarization mode conversion.

The light sources of an image display apparatus according to the invention preferably show an enhanced level of color purity. Specific examples of devices that can be used for the light sources of an image display apparatus according to the invention include semiconductor laser devices and organic electro luminescence devices besides light emitting diodes.

In the case of a light emitting diode or a semiconductor laser device adapted to emit red light, it is preferably made of a material containing at least an element selected from a group of elements including B, Al, Ga, In and Ti and at least an element selected from a group of elements including N, P, As and Sb. Particularly, the use of a compound selected from a group of compounds including AlGaAs or those including AlGaInP is preferable.

On the other hand, in the case of a light emitting diode or a semiconductor laser device adapted to emit green light, it is preferably made of a material containing at least an element selected from a group of elements including B, Al, Ga, In and Tl and at least an element selected from a group of elements including N, P, As and Sb or a material containing at least an element selected from a group of elements including Be, Mg, Zn and Cd and at least an element selected from a group of elements including O, S, Se and Te. Particularly, the use of a compound selected from a group of compounds including AlGaN or those including ZnCdSe/ZnMgSSe is preferable.

Finally, in the case of a light emitting diode or a semiconductor laser device adapted to emit blue light, it is preferably made of a material containing at least an element selected from a group of elements including B, Al, Ga, In and n and at least an element selected from a group of elements including N, P, As and Sb or a material containing at least an element selected from a group of elements including Be, Mg, Zn and Cd and at least an element selected from a group of elements including O, S, Se and Te. Particularly, the use of a compound selected from a group of compounds including AlGaN or those including ZnCdSe/ZnMgSSe is preferable. Additionally, a compound selected from a group of compounds including SiC and other similar compounds of the IV group elements may be used for a light emitting diode or a semiconductor laser device operating as light source for the purpose of the invention.

Alternatively, a light emitting diode or a semiconductor laser device operating as light source for the purpose of the present invention may be made of a material such as p-Si or p-Ge.

If an organic electro luminescence device is used as light source for the purpose of the invention, it may preferably have a multilayer structure of materials selected from DST, TPD, CuPc, Alq, MTDATA, PPV, CN-PPV, PTPDMA, PTPDES, PVK, PVOXD, BeBq, ZnBq and rubrene, on which an electrode of ITO or MgIn is formed.

The transmission type light valve of an image display apparatus according to the invention may be an STN (super twisted nematic) liquid crystal display device, a ferromagnetic liquid crystal display device or a polymer dispersion type liquid crystal device. Such a device may be driven by means of a simple matrix drive system or an active matrix drive system, either of which may feasibly be used for the purpose of the invention.

On the other hand, the reflection type light valve of an image display apparatus according to the invention may be a reflection type liquid crystal display device comprising a glass or silicon substrate and a drive electrode or an active device for driving TN (twisted nematic) mode liquid crystal, ferromagnetic crystal liquid or polymer dispersion type liquid crystal. Alternatively, the reflection type light valve may be a reflection type liquid crystal display device adapted to apply a voltage to liquid crystal by irradiating the latter with light by way of a photoconductive film. Still alternatively, the reflection type light valve may be a reflection type display device having a structure that changes its shape and state as a function of the electric field applied to it such as a grating light valve.

INDUSTRIAL APPLICABILITY

In an image display apparatus according to the invention, light emitted from the light source can be made to irradiate the light valve effectively and efficiently. Therefore, according to the invention, there is provided an excellent image display apparatus that shows an enhanced efficiency of irradiation of light as emitted from the light source.

What is claimed is:

1. An image display apparatus characterized in that it comprises:

a coupling lens for focusing light emitted from said light source:

an integrator adapted to receive focused light coming from said coupling lens; and a substantially rectangularly parallelepipedic light valve adapted to be irradiated with light coming from said light source by way of said coupling lens and said integrator; and that said integrator is adapted to uniformize the distribution of intensity of light within the region of irradiation of light over said light valve; and the surface area of the light emitting region of said light source is not greater than $(L_{LV1} \times \theta_{LV1}/NA_{LED}) \times (L_{LV2} \times \theta_{LV2}/NA_{LED})$, where $\theta_{LV1}$ represents the largest value that can be taken by the angle formed by light irradiating said light valve and the optical axis as viewed along the short edges of said light valve, $\theta_{LV2}$ represents the largest value that can be taken by the angle formed by light irradiating said light valve and the optical axis as viewed along the long edges of said light valve, $L_{LV1}$ represents the length of the short edges of said light valve, $L_{LV2}$ represents the length of the long edge of said light valve and $NA_{LED}$ represents the effective numerical aperture of said coupling lens.

2. An image display apparatus according to claim 1, characterized in that said light source comprises a light emitting diode, a semiconductor laser device or an organic electroluminescence device.

3. An image display apparatus according to claim 1, characterized in that the light emitting region of said light source has a contour similar to that of the light valves.

4. An image display apparatus according to claim 1, characterized in that said light source includes a plurality of light emitting devices and the total surface area of the light emitting regions of the light emitting devices is not greater than $(L_{LV1} \times \theta_{LV1}/NA_{LED}) \times (L_{LV2} \times \theta_{LV2}/NA_{LED})$.

5. An image display apparatus according to claim 4, characterized in that the light emitting region of each of said light emitting devices has a contour similar to that of the light valves.

6. An image display apparatus according to claim 1, characterized in that the display area of said light valve for actually displaying an image has short edges with a length equal to or smaller than the length $L_{LV1}$ of the short edges of said light valve and long edges with a length equal to or smaller than the length $L_{LV2}$ of the long edges of said light valve.

7. An image display apparatus according to claim 6, characterized in that the length $L_{LV1}$ of the short edges and the length $L_{LV2}$ of the long edges of said light valve are respectively greater than the length of the short edges and the length of the long edges of said display area of said light valve by 2 to 50%.

8. An image display apparatus according to claim 1, characterized in that said light source comprises a light emitting diode or a semiconductor laser device adapted to emit red light.

9. An image display apparatus according to claim 8, characterized in that said light emitting diode or said semiconductor laser device adapted to emit red light is made of a material containing at least an element selected from a group of elements including B, Al, Ga, In and Tl and at least an element selected from a group of elements including N, P, As and Sb.

10. An image display apparatus according to claim 1, characterized in that said light source comprises a light emitting diode or a semiconductor laser device adapted to emit green light.

11. An image display apparatus according to claim 10, characterized in that said light emitting diode or said semiconductor laser device adapted to emit green light is made of a material containing at least an element selected from a group of elements including B, Al, Ga, In and Tl and at least an element selected from a group of elements including N, P, As and Sb.

12. An image display apparatus according to claim 10, characterized in that said light emitting diode or said semiconductor laser device adapted to emit green light is made of a material containing at least an element selected from a group of elements including Be, Mg, Zn and Cd and at least an element selected from a group of elements including O, S, Se and Te.

13. An image display apparatus according to claim 1, characterized in that said light source comprises a light emitting diode or a semiconductor laser device adapted to emit blue light.

14. An image display apparatus according to claim 13, characterized in that said light emitting diode or said semiconductor laser device adapted to emit blue light is made of a material containing at least an element selected from a group of elements including B, Al, Ga, In and Tl and at least an element selected from a group of elements including N, P, As and Sb.

15. An image display apparatus according to claim 13, characterized in that said light emitting diode or said semiconductor laser device adapted to emit blue light is made of a material containing at least an element selected from a group of elements including Be, Mg, Zn and Cd and at least an element selected from a group of elements including O, S, Se and Te.

* * * * *